United States Patent
Dawes

(10) Patent No.: US 7,826,702 B2
(45) Date of Patent: Nov. 2, 2010

(54) OPTICALLY COUPLING INTO HIGHLY UNIFORM WAVEGUIDES

(75) Inventor: David Dawes, Dublin, OH (US)

(73) Assignee: SpringWorks, LLC, Minnetonka, MN (US)

( * ) Notice: Subject to any disclaimer, the term of this patent is extended or adjusted under 35 U.S.C. 154(b) by 0 days.

(21) Appl. No.: 10/650,461

(22) Filed: Aug. 27, 2003

(65) Prior Publication Data

US 2004/0105644 A1   Jun. 3, 2004

Related U.S. Application Data

(60) Provisional application No. 60/406,451, filed on Aug. 27, 2002.

(51) Int. Cl.
G02B 6/10 (2006.01)

(52) U.S. Cl. .......................................... 385/129; 385/14

(58) Field of Classification Search ............. 385/31–34, 385/129–132
See application file for complete search history.

(56) References Cited

U.S. PATENT DOCUMENTS

| 3,309,302 A | 3/1967 | Heil |
| 3,616,403 A | 10/1971 | Collins et al. |
| 3,850,604 A | 11/1974 | Klein |
| 4,082,569 A | 4/1978 | Evans, Jr. |
| 4,111,523 A | 9/1978 | Kaminow et al. |
| 4,437,966 A | 3/1984 | Hope et al. |
| 4,587,225 A | 5/1986 | Tsukuma et al. |
| 4,619,680 A | 10/1986 | Nourshargh et al. |
| RE32,499 E | 9/1987 | Claussen et al. |
| 4,710,940 A | 12/1987 | Sipes, Jr. |
| 4,785,459 A | 11/1988 | Baer |
| 4,915,810 A | 4/1990 | Kestigian et al. |
| 4,978,437 A | 12/1990 | Wirz |
| 5,085,904 A | 2/1992 | Deak et al. |
| 5,107,538 A | 4/1992 | Benton et al. |
| 5,119,460 A | 6/1992 | Bruce et al. |
| 5,173,271 A | 12/1992 | Chen et al. |
| 5,174,876 A | 12/1992 | Buchal et al. |

(Continued)

FOREIGN PATENT DOCUMENTS

DE    37 38 738 C1    1/1989

(Continued)

OTHER PUBLICATIONS

Beach, R.J., "Theory and optimization of lens ducts", Applied Optics, Apr. 20, 1996, vol. 35, No. 12 (pp. 2005-2015).*

(Continued)

*Primary Examiner*—Charlie Peng
*Assistant Examiner*—Peter Radkowski
(74) *Attorney, Agent, or Firm*—Haynes and Boone, LLP

(57) ABSTRACT

In accordance with the present invention, one or more laser diodes are efficiently coupled into a waveguide amplifier in order to provide either an efficient amplifier or a laser. Light from one or more laser diodes is efficiently coupled into one or more waveguides through the effects in the refractive index between the core material of the waveguide and the cladding material around the waveguide. Both the core material and the cladding material can be deposited with a high degree of uniformity and control in order to obtain the coupling.

17 Claims, 11 Drawing Sheets

U.S. PATENT DOCUMENTS

| | | | |
|---|---|---|---|
| 5,196,041 A | 3/1993 | Tumminelli et al. | |
| 5,200,029 A | 4/1993 | Bruce et al. | |
| 5,206,925 A | 4/1993 | Nakazawa et al. | |
| 5,225,288 A | 7/1993 | Beeson et al. | |
| 5,237,439 A | 8/1993 | Misono et al. | |
| 5,252,194 A | 10/1993 | Demaray et al. | |
| 5,287,427 A | 2/1994 | Atkins et al. | |
| 5,296,089 A | 3/1994 | Chen et al. | |
| 5,303,319 A | 4/1994 | Ford et al. | |
| 5,306,569 A | 4/1994 | Hiraki | |
| 5,309,302 A | 5/1994 | Vollmann | |
| 5,338,625 A | 8/1994 | Bates et al. | |
| 5,355,089 A | 10/1994 | Treger | |
| 5,362,672 A | 11/1994 | Ohmi et al. | |
| 5,381,262 A | 1/1995 | Arima et al. | |
| 5,427,669 A | 6/1995 | Drummond | |
| 5,435,826 A | 7/1995 | Sakakibara et al. | |
| 5,457,569 A | 10/1995 | Liou et al. | |
| 5,472,795 A | 12/1995 | Atita | |
| 5,475,528 A | 12/1995 | LaBorde | |
| 5,478,456 A | 12/1995 | Humpal et al. | |
| 5,483,613 A | 1/1996 | Bruce et al. | |
| 5,499,207 A | 3/1996 | Miki et al. | |
| 5,512,147 A | 4/1996 | Bates et al. | |
| 5,538,796 A | 7/1996 | Schaffer et al. | |
| 5,555,127 A | 9/1996 | Abdelkader et al. | |
| 5,561,004 A | 10/1996 | Bates et al. | |
| 5,563,979 A | 10/1996 | Bruce et al. | |
| 5,565,071 A | 10/1996 | Demaray et al. | |
| 5,569,520 A | 10/1996 | Bates | |
| 5,591,520 A | 1/1997 | Migliorini et al. | |
| 5,597,660 A | 1/1997 | Bates et al. | |
| 5,603,816 A | 2/1997 | Demaray et al. | |
| 5,607,560 A | 3/1997 | Hirabayashi et al. | |
| 5,607,789 A | 3/1997 | Treger et al. | |
| 5,612,152 A | 3/1997 | Bates | |
| 5,613,995 A | 3/1997 | Bhandarkar et al. | |
| 5,645,626 A | 7/1997 | Edlund et al. | |
| 5,654,054 A | 8/1997 | Tropsha et al. | |
| 5,654,984 A | 8/1997 | Hershbarger et al. | |
| 5,686,360 A | 11/1997 | Harvey, III et al. | |
| 5,689,522 A | 11/1997 | Beach | 372/75 |
| 5,693,956 A | 12/1997 | Shi et al. | |
| 5,702,829 A | 12/1997 | Paidassi et al. | |
| 5,718,813 A | 2/1998 | Drummond et al. | |
| 5,719,976 A | 2/1998 | Henry et al. | |
| 5,731,661 A | 3/1998 | So et al. | |
| 5,738,731 A | 4/1998 | Shindo et al. | |
| 5,755,938 A | 5/1998 | Fukui et al. | |
| 5,757,126 A | 5/1998 | Harvey, III et al. | |
| 5,761,234 A * | 6/1998 | Craig et al. | 372/75 |
| 5,762,768 A | 6/1998 | Goy et al. | |
| 5,771,562 A | 6/1998 | Harvey, III et al. | |
| 5,789,071 A | 8/1998 | Sproul et al. | |
| 5,792,550 A | 8/1998 | Phillips et al. | |
| 5,811,177 A | 9/1998 | Shi et al. | |
| 5,830,330 A | 11/1998 | Lantsman | |
| 5,831,262 A | 11/1998 | Greywall et al. | |
| 5,841,931 A | 11/1998 | Foresi et al. | |
| 5,847,865 A | 12/1998 | Gopinath et al. | |
| 5,849,163 A | 12/1998 | Ichikawa et al. | |
| 5,853,830 A | 12/1998 | McCaulley et al. | |
| 5,855,744 A | 1/1999 | Halsey et al. | |
| 5,870,273 A | 2/1999 | Sogabe et al. | |
| 5,882,946 A | 3/1999 | Otani | |
| 5,900,057 A | 5/1999 | Buchal et al. | |
| 5,909,346 A | 6/1999 | Malhotra et al. | |
| 5,930,046 A | 7/1999 | Solberg et al. | |
| 5,930,584 A | 7/1999 | Sun et al. | |
| 5,942,089 A | 8/1999 | Sproul et al. | |
| 5,948,215 A | 9/1999 | Lantsman | |
| 5,952,778 A | 9/1999 | Haskal et al. | |
| 5,961,682 A | 10/1999 | Lee et al. | |
| 5,966,491 A | 10/1999 | DiGiovanni | |
| 5,972,516 A * | 10/1999 | Kaneko et al. | 428/429 |
| 5,977,582 A | 11/1999 | Fleming et al. | |
| 6,000,603 A | 12/1999 | Koskenmaki et al. | |
| 6,001,224 A | 12/1999 | Drummond et al. | |
| 6,004,660 A | 12/1999 | Topolski et al. | |
| 6,024,844 A | 2/2000 | Drummond | |
| 6,045,626 A | 4/2000 | Yano et al. | |
| 6,046,081 A | 4/2000 | Kuo | |
| 6,051,114 A | 4/2000 | Yao et al. | |
| 6,051,296 A | 4/2000 | McCaulley et al. | |
| 6,052,397 A | 4/2000 | Jeon et al. | 372/46 |
| 6,057,557 A | 5/2000 | Ichikawa | |
| 6,058,233 A | 5/2000 | Dragone | |
| 6,071,323 A | 6/2000 | Kawaguchi | |
| 6,077,642 A | 6/2000 | Ogata et al. | |
| 6,080,643 A | 6/2000 | Noguchi et al. | |
| 6,088,492 A * | 7/2000 | Kaneko et al. | 385/14 |
| 6,093,944 A | 7/2000 | VanDover | |
| 6,106,933 A | 8/2000 | Nagai et al. | |
| 6,117,279 A | 9/2000 | Smolanoff et al. | |
| 6,133,670 A | 10/2000 | Rodgers et al. | |
| 6,146,225 A | 11/2000 | Sheats et al. | |
| 6,154,582 A | 11/2000 | Bazylenko et al. | |
| 6,157,765 A | 12/2000 | Bruce et al. | |
| 6,162,709 A | 12/2000 | Raux et al. | |
| 6,165,566 A | 12/2000 | Tropsha | |
| 6,168,884 B1 | 1/2001 | Neudecker et al. | |
| 6,176,986 B1 | 1/2001 | Watanabe et al. | |
| 6,197,167 B1 | 3/2001 | Tanaka | |
| 6,198,217 B1 | 3/2001 | Suzuki et al. | |
| 6,204,111 B1 | 3/2001 | Uemoto et al. | |
| 6,210,544 B1 | 4/2001 | Sasaki | |
| 6,214,660 B1 | 4/2001 | Uemoto et al. | |
| 6,232,242 B1 | 5/2001 | Hata et al. | |
| 6,236,793 B1 | 5/2001 | Lawrence et al. | |
| 6,242,129 B1 | 6/2001 | Johnson | |
| 6,242,132 B1 | 6/2001 | Neudecker et al. | |
| 6,248,291 B1 | 6/2001 | Nakagama et al. | |
| 6,248,640 B1 | 6/2001 | Nam | |
| 6,261,917 B1 | 7/2001 | Quek et al. | |
| 6,280,585 B1 | 8/2001 | Obinata et al. | |
| 6,280,875 B1 | 8/2001 | Kwak et al. | |
| 6,281,142 B1 | 8/2001 | Basceri et al. | |
| 6,287,986 B1 | 9/2001 | Mihara | |
| 6,288,835 B1 | 9/2001 | Nilsson et al. | |
| 6,290,821 B1 | 9/2001 | McLeod | |
| 6,290,822 B1 | 9/2001 | Fleming et al. | |
| 6,300,215 B1 | 10/2001 | Shin | |
| 6,302,939 B1 | 10/2001 | Rabin et al. | |
| 6,306,265 B1 | 10/2001 | Fu et al. | |
| 6,344,419 B1 | 2/2002 | Forster et al. | |
| 6,350,353 B2 | 2/2002 | Gopalraja et al. | |
| 6,356,694 B1 | 3/2002 | Weber | |
| 6,358,810 B1 | 3/2002 | Dornfest et al. | |
| 6,361,662 B1 | 3/2002 | Chiba et al. | |
| 6,365,300 B1 | 4/2002 | Ota et al. | |
| 6,365,319 B1 | 4/2002 | Heath et al. | |
| 6,376,027 B1 | 4/2002 | Lee et al. | |
| 6,409,965 B1 | 6/2002 | Nagata et al. | |
| 6,413,382 B1 | 7/2002 | Wang et al. | |
| 6,413,645 B1 | 7/2002 | Graff et al. | |
| 6,416,598 B1 | 7/2002 | Sircar | |
| 6,423,776 B1 | 7/2002 | Akkapeddi et al. | |
| 6,433,380 B2 | 8/2002 | Shin | |
| 6,444,750 B1 | 9/2002 | Touhsaent | |
| 6,452,717 B1 | 9/2002 | Endo | |
| 6,488,822 B1 | 12/2002 | Moslehi | |
| 6,506,289 B2 | 1/2003 | Demaray et al. | |
| 6,511,615 B1 | 1/2003 | Dawes et al. | |
| 6,533,907 B2 * | 3/2003 | Demaray et al. | 204/192.25 |

| | | |
|---|---|---|
| 6,537,428 B1 | 3/2003 | Xiong et al. |
| 6,549,688 B2 * | 4/2003 | Bazylenko .................. 385/14 |
| 6,563,998 B1 | 5/2003 | Farah et al. |
| 6,576,546 B2 | 6/2003 | Gilbert et al. |
| 6,602,338 B2 | 8/2003 | Chen et al. |
| 6,605,228 B1 | 8/2003 | Kawaguchi et al. |
| 6,615,614 B1 | 9/2003 | Makikawa et al. |
| 6,632,563 B1 | 10/2003 | Krasnov et al. |
| 6,641,704 B2 | 11/2003 | Someno |
| 6,673,716 B1 | 1/2004 | D'Couto et al. |
| 6,683,244 B2 | 1/2004 | Fujimori et al. |
| 6,683,749 B2 | 1/2004 | Daby et al. |
| 6,750,156 B2 | 6/2004 | Le et al. |
| 6,751,241 B2 * | 6/2004 | Davis et al. .................. 372/6 |
| 6,760,520 B1 * | 7/2004 | Medin et al. ................ 385/43 |
| 6,768,855 B1 | 7/2004 | Bakke et al. |
| 6,818,356 B1 | 11/2004 | Bates |
| 6,827,826 B2 | 12/2004 | Demaray et al. |
| 6,846,765 B2 | 1/2005 | Imamura et al. |
| 6,884,327 B2 | 4/2005 | Pan et al. |
| 7,218,809 B2 * | 5/2007 | Zhou et al. .................. 385/28 |
| 7,340,124 B2 * | 3/2008 | Patel et al. .................. 385/16 |
| 7,378,356 B2 | 5/2008 | Zhang et al. |
| 7,381,657 B2 | 6/2008 | Zhang et al. |
| 7,404,877 B2 | 7/2008 | Demaray et al. |
| 7,413,998 B2 | 8/2008 | Zhang et al. |
| 7,469,558 B2 | 12/2008 | Demaray et al. |
| 7,544,276 B2 | 6/2009 | Zhang et al. |
| 2001/0027159 A1 | 10/2001 | Kaneyoshi |
| 2001/0031122 A1 * | 10/2001 | Lackritz et al. ............ 385/131 |
| 2001/0041460 A1 | 11/2001 | Wiggins |
| 2002/0001746 A1 | 1/2002 | Jenson |
| 2002/0014406 A1 | 2/2002 | Takashima |
| 2002/0033330 A1 | 3/2002 | Demaray et al. |
| 2002/0076133 A1 | 6/2002 | Li et al. |
| 2002/0106297 A1 | 8/2002 | Ueno et al. |
| 2002/0115252 A1 | 8/2002 | Haukka et al. |
| 2002/0134671 A1 | 9/2002 | Demaray et al. |
| 2002/0140103 A1 | 10/2002 | Kloster et al. |
| 2002/0170821 A1 | 11/2002 | Sandlin et al. |
| 2002/0191916 A1 | 12/2002 | Frish et al. |
| 2003/0007718 A1 * | 1/2003 | Bazylenko .................. 385/14 |
| 2003/0019326 A1 | 1/2003 | Han et al. |
| 2003/0022487 A1 | 1/2003 | Yoon et al. |
| 2003/0035906 A1 | 2/2003 | Memarian et al. |
| 2003/0042131 A1 | 3/2003 | Johnson |
| 2003/0044118 A1 * | 3/2003 | Zhou et al. .................. 385/43 |
| 2003/0063629 A1 * | 4/2003 | Davis et al. .................. 372/6 |
| 2003/0063883 A1 | 4/2003 | Demaray et al. ............ 385/129 |
| 2003/0077914 A1 | 4/2003 | Le et al. |
| 2003/0079838 A1 | 5/2003 | Brcka |
| 2003/0097858 A1 | 5/2003 | Strohhofer et al. |
| 2003/0127319 A1 | 7/2003 | Demaray et al. |
| 2003/0134054 A1 | 7/2003 | Demaray et al. |
| 2003/0141186 A1 | 7/2003 | Wang et al. |
| 2003/0173207 A1 | 9/2003 | Zhang et al. |
| 2003/0173208 A1 | 9/2003 | Pan et al. |
| 2003/0174391 A1 | 9/2003 | Pan et al. |
| 2003/0175142 A1 | 9/2003 | Milonopoulou et al. |
| 2003/0178637 A1 | 9/2003 | Chen et al. |
| 2003/0185266 A1 * | 10/2003 | Henrichs .................. 372/96 |
| 2004/0043557 A1 | 3/2004 | Haukka et al. |
| 2004/0077161 A1 | 4/2004 | Chen et al. |
| 2004/0105644 A1 | 6/2004 | Dawes |
| 2004/0259305 A1 | 12/2004 | Demaray et al. |
| 2005/0000794 A1 | 1/2005 | Demaray et al. |
| 2005/0006768 A1 | 1/2005 | Narasimhan et al. |
| 2005/0048802 A1 | 3/2005 | Zhang et al. |
| 2005/0175287 A1 | 8/2005 | Pan et al. |
| 2005/0183946 A1 | 8/2005 | Pan et al. |
| 2005/0225839 A1 * | 10/2005 | Patel et al. .................. 359/333 |
| 2006/0054496 A1 | 3/2006 | Zhang et al. |
| 2006/0057283 A1 | 3/2006 | Zhang et al. |
| 2006/0057304 A1 | 3/2006 | Zhang et al. |
| 2006/0071592 A1 | 4/2006 | Narasimhan et al. |
| 2006/0134522 A1 | 6/2006 | Zhang et al. |
| 2007/0263676 A1 * | 11/2007 | Beukema et al. .............. 372/6 |
| 2008/0107376 A1 * | 5/2008 | Patel et al. .................. 385/16 |

FOREIGN PATENT DOCUMENTS

| | | |
|---|---|---|
| EP | 0 510 883 A2 | 10/1992 |
| EP | 0 639 655 A1 | 2/1995 |
| EP | 0 652 308 A2 | 5/1995 |
| EP | 0 820 088 A2 | 1/1998 |
| EP | 0 867 985 B1 | 9/1998 |
| EP | 1 068 899 A1 | 1/2001 |
| EP | 1 092 689 A1 | 4/2001 |
| EP | 1 189 080 A2 | 3/2002 |
| JP | 61-60803 | 3/1986 |
| JP | 62-287071 | 12/1987 |
| JP | 2-054764 A2 | 2/1990 |
| JP | 5-230642 A | 9/1993 |
| JP | 6-010127 A | 1/1994 |
| JP | 6-100333 A | 12/1994 |
| JP | 7-233469 A | 5/1995 |
| JP | 7-224379 A | 8/1995 |
| KR | 2003-0088236 | 11/2003 |
| WO | WO 96/23085 A1 | 8/1996 |
| WO | WO 97/35044 A1 | 9/1997 |
| WO | WO 99/61674 A1 | 12/1999 |
| WO | WO 00/21898 A1 | 4/2000 |
| WO | WO 00/22742 A2 | 4/2000 |
| WO | WO 00/36665 A1 | 6/2000 |
| WO | WO 01/82297 A1 | 11/2001 |
| WO | WO 02/12932 A2 | 2/2002 |
| WO | WO 2004/021532 A1 | 3/2004 |
| WO | WO 2004/077519 A2 | 9/2004 |
| WO | WO 2004/106581 A2 | 12/2004 |
| WO | WO 2004/106582 A2 | 12/2004 |
| WO | WO 2006/063308 A2 | 5/2006 |

OTHER PUBLICATIONS

Hubner et al, "Planer Er-and Yb-Doped Amplifiers and Lasers," COM Technical University of Denmark, 10$^{th}$ European Conferecne on Integrated Optics, Session WeB2, pp. 71-74 (2001).*

Cocorullo et al. "Amorphous silicon waveguides and light modulators for integrated photonics realized by low-temperature plasma-enhanced chemical-vapor deposition." Optics Letters, vol. 21, No. 24. Dec. 15, 1996.*

Hubner et al, "Planar Er- and Yb-Doped Amplifiers and Lases," COM Technical University of Denmark, 10th European Conference on Integrated Optics, Session WeB2, pp. 71-74 (2001).*

Cocorullo et al. "Amorphous silicon waveguides and light modulators for integrated photonics realized by low-temperatuer plasma-enhanced chemical-vapor deposition," 1996, Optics Letters, vol. 21, No. 24, pp. 2002-2004.*

Beach, Raymond, "Theory and optimization of lens ducts," 1996, Applied Optics, vol. 35, No. 12, pp. 2005-2015.*

Hubner et al. "Plan Er- and Yb-Doped Amplifiers and Lasers," 2001, COM Technical University of Denmark, 10th European Conference on Integrated Optics, Session WeB2, pp. 71-74.*

*ASM Handbook*, Formerly Ninth Edition, Metals Handbook, vol. 15, Casting, Davis et al. (Eds.), ASM International, pp. 372-373, 376-383, and 410-411 (1988).

Crowder, M.A. et al., "Low-Temperature Single-Crystal Si TFT's Fabricated on Si Films Processed via Sequential Lateral Solidification," *IEEE Electron Device Lett.* 19(8):306-308 (1998).

Dorey, R.A., "Low temperature micromoulding of functional ceramic devices," Grant summary for GR/S84156/01 for the UK Engineering and Physical Sciences Research Council, 2 pages (2004).

Greene, J.E. et al., "Morphological and electrical properties of rf sputtered $Y_2O_3$-doped $ZrO_2$ thin films," *J. Vac. Sci. Tech.* 13(1):72-75 (1976).

Howson, R.P., "The reactive sputtering of oxides and nitrides," *Pure & Appl. Chem.* 66(6):1311-1318 (1994).
Hwang, M-S. et al., "The effect of pulsed magnetron sputtering on the properties of indium tin oxide thin films," *Surface and Coatings Tech.* 171:29-33 (2003).
IM, J.S. & Sposili, R.S., "Crystalline Si Films for Integrated Active-Matrix Liquid Crystal Displays," *MRS Bulletin*, pp. 39-48 (1996).
IM, J.S. et al. "Controlled Super-Lateral Growth of Si Films for Microstructural Manipulation and Optimization," *Physica Status Solidi (A)* 166(2):603-617 (1998).
IM, J.S. et al., "Single-crystal Si films for thin-film transistor devices," *Appl. Physics Lett.* 70(25):3434-3436 (1997).
Kelly, P.J. et al., "A novel technique for the deposition of aluminum-doped zinc oxide films," *Thin Solid Films* 426(1-2):111-116 (2003).
Kim, H-K. & Yoon, Y., "Characteristics of rapid-thermal-annealed $LiCoO_2$ cathode film for an all-solid-state thin film microbattery," *J. Vac. Sci. Technol. A* 22(4):1182-1187 (2004).
Tomaszewski, H. et al., "Yttria-stabilized zirconia thin films grown by reactive r.f. magnetron sputtering," *Thin Solid Films* 287:104-109 (1996).
Tukamoto, H. & West, A.R., "Electronic Conductivity of LiCoOs and Its Enhancement by Magnesium Doping," *J. Electrochem. Soc.* 144(9):3164-3168 (1997).
Office Action issued on Sep. 27, 2004 in U.S. Appl. No. 10/291,179.
Response to Office Action filed on Mar. 14, 2005 in U.S. Appl. No. 10/291,179.
Office Action issued on Jun. 15, 2005 in U.S. Appl. No. 10/291,179.
Response to Office Action filed on Oct. 17, 2005 in U.S. Appl. No. 10/291,179.
Final Office Action issued on Dec. 14, 2005 in U.S. Appl. No. 10/291,179.
Response to Final Office Action filed Apr. 14, 2006, in U.S. Appl. No. 10/291,179.
Office Action mailed Apr. 27, 2006, in U.S. Appl. No. 10/291,179.
Response to Office Action filed Jul. 27, 2006, in U.S. Appl. No. 10/291,179.
Notice of Allowance mailed Aug. 6, 2002, for U.S. Patent No. 6,506,289.
Notice of Allowance mailed Nov. 10, 2003, for U.S. Patent No. 6,827,826.
PCT Invitation to Pay Additional Fees for PCT/US01/22750, dated Mar. 13, 2002.
PCT International Search Report for PCT/US01/22750, dated Jul. 19, 2002.
PCT Written Opinion for PCT/US01/22750, dated Jul. 23, 2002.
PCT International Preliminary Examination Report for PCT/US01/22750, dated Oct. 8, 2002.
Amendment/RCE filed on Mar. 10, 2005 in U.S. Appl. No. 09/903,081.
Office Action issued on Mar. 17, 2005 in U.S. Appl. No. 09/903,081.
Response to Office Action filed on Jun. 17, 2005 in U.S. Appl. No. 09/903,081.
Office Action issued on Jul. 8, 2005 in U.S. Appl. No. 09/903,081.
Office Action issued on Nov. 28, 2005 in U.S. Appl. No. 09/903,081.
Response to Office Action filed Feb. 28, 2006 in U.S. Appl. No. 09/903,081.
Final Office Action mailed May 8, 2006 in U.S. Appl. No. 09/903,081.
Office Action issued Sep. 21, 2005 in U.S. Appl. No. 11/100,856.
Response to Office Action filed Feb. 17, 2006 in U.S. Appl. No. 11/100,856.
Final Office Action mailed Jun. 9, 2006 in U.S. Appl. No. 11/100,856.
Office Action dated Jan. 13, 2005, in U.S. Appl. No. 10/101,863.
Response to Office Action filed on Jun. 10, 2005 in U.S. Appl. No. 10/101,863.
Office Action issued on Aug. 4, 2005, in U.S. Appl. No. 10/101,863.
Response to Office Action filed Dec. 5, 2005, in U.S. Appl. No. 10/101,863.
Final Office Action issued on Feb. 14, 2006, in U.S. Appl. No. 10/101,863.
Response to Office Action filed Feb. 24, 2006, in U.S. Appl. No. 10/101,863.
Office Action mailed Mar. 22, 2006, in U.S. Appl. No. 10/101,863.
Response to Office Action filed Jun. 12, 2006, in U.S. Appl. No. 10/101,863.
Office Action dated Mar. 25, 2005, received in U.S. Appl. No. 10/954,182.
Response to Office Action filed on Jul. 25, 2005 in U.S. Appl. No. 10/954,182.
Office Action issued on Oct. 25, 2005, in U.S. Appl. No. 10/954,182.
Response to Office Action filed on Dec. 21, 2005 in U.S. Appl. No. 10/954,182.
Office Action issued on Mar. 9, 2006, in U.S. Appl. No. 10/954,182.
Response to Office Action filed on Aug. 9, 2006 in U.S. Appl. No. 10/954,182.
Office Action issued on Aug. 8, 2005 in U.S. Appl. No. 10/101,341.
Response to Office Action filed on Nov. 8, 2005, in U.S. Appl. No. 10/101,341.
Office Action issued on Feb. 13, 2006, in U.S. Appl. No. 10/101,341.
Response to Office Action filed on May 15, 2006, in U.S. Appl. No. 10/101,341.
Office Action issued on Aug. 2, 2006, in U.S. Appl. No. 10/101,341.
International Preliminary Examination Report mailed on Apr. 15, 2004 in PCT/US03/24809.
Office Action issued on Dec. 2, 2005 in U.S. Appl. No. 10/789,953.
Response to Office Action filed on Mar. 2, 2006, in U.S. Appl. No. 10/789,953.
Final Office Action issued on May 19, 2006 in U.S. Appl. No. 10/789,953.
Specification and Preliminary Amendment as filed for U.S. Appl. No. 11/297,057.
Office Action from Singapore Patent Office in Appl. No. 200505388-9, dated Mar. 20, 2006.
Office Action issued on Mar. 24, 2005 in U.S. Appl. No. 10/851,542.
Response to Office Action dated Jul. 25, 2005 in U.S. Appl. No. 10/851,542.
Office Action issued on Oct. 19, 2005 in U.S. Appl. No. 10/851,542.
Response to Office Action filed Jan. 19, 2006 in U.S. Appl. No. 10/851,542.
Office Action mailed Apr. 19, 2006 in U.S. Appl. No. 10/851,542.
Response to Office Action filed Jul. 26, 2006 in U.S. Appl. No. 10/851,542.
PCT International Search Report and Written Opinion for Application No. PCT/US2004/014524 dated Mar. 2, 2005.
PCT International Preliminary Report on Patentability for Application No. PCT/US2004/014524, dated Dec. 8, 2005.
PCT International Search Report for Application No. PCT/US2004/014523, dated Jan. 17, 2005.
PCT Written Opinion for Application No. PCT/US2004/014523, dated Jan. 17, 2005.
PCT International Preliminary Report on Patentability for Application No. PCT/US2004/014523, dated Dec. 8, 2005.
Specification as filed Sep. 2, 2005, for U.S. Appl. No. 11/218,652.
Notice of Appeal filed Apr. 25, 2008, in U.S. Appl. No. 09/903,081.
Appeal Brief filed Jun. 30, 2008, in U.S. Appl. No. 09/903,081.
Notice of Allowance mailed Aug. 22, 2008, in U.S. Appl. 09/903,081.
Office Action mailed Jun. 30, 2008, in U.S. Appl. No. 11/100,856.
Office Action mailed May 29, 2008, in U.S. Appl. No. 11/228,834.
Agrawal, G.P., in: Fiber-Optic Communication Systems, 2nd Edition, John Wiley & Sons, New York, pp. 361-399 and 415 (1997).
Masuda, H. & Kawai, S., "Wide-band and gain-flattened hybrid fiber amplifier consisting of an EDFA and a multiwavelength pumped raman amplifier," *IEEE Photonics Technology Lett.* 11(6):647-649 (1999).
Snoeks, E. et al., "Cooperative upconversion in erbium-implanted soda-lime silicate glass optical waveguides," *J. Opt. Soc. Am. B* 12(8):1468-1474 (1995).
Notice of Allowance mailed Mar. 25, 2004, for US Patent No. 6,827,826.
Notice of Allowance mailed Oct. 8, 2002, for U.S. Patent No. 6,533,907.
Response to Office Action dated Oct. 19, 2006, in U.S. Appl. No. 09/903,081.
Office Action dated Dec. 18, 2006, in U.S. Appl. No. 09/903,081.
Notice of Allowance mailed Oct. 21, 2004, in U.S. Appl. No. 10/101,492.

Response to Office Action dated Sep. 11, 2006, in U.S. Appl. No. 11/100,856.
Office Action dated Dec. 1, 2006, in U.S. Appl. No. 11/100,856.
Office Action mailed Sep. 6, 2006, in U.S. Appl. No. 11/101,863.
Response to Office Action dated Feb. 6, 2007, in U.S. Appl. No. 10/101,863.
Office Action dated Oct. 31, 2006, in U.S. Appl. No. 10/954,182.
Response to Office Action dated Dec. 6, 2006, in U.S. Appl. No. 10/954,182.
Supplemental Preliminary Amendment dated Feb. 6, 2007, in U.S. Appl. No. 11/228,834.
Supplemental Preliminary Amendment dated Feb. 6, 2007, in U.S. Appl. No. 11/191,643.
Voluntary Amendment dated Jul. 26, 2006 in TW Appl. No. 92123625.
Amendment/RCE filed Aug. 9, 2007, in U.S. Appl. No. 09/903,081.
Office Action dated Sep. 5, 2007, in U.S. Appl. No. 09/903,081.
Final Office Action dated Sep. 7, 2007, in U.S. Appl. No. 11/100,856.
Response to Final Office Action filed Oct. 2, 2007, in U.S. Appl. No. 10/101,863.
Final Office Action dated Jul. 24, 2007, in U.S. Appl. No. 10/954,182.
Jonsson, L.B. et al., "Frequency response in pulsed DC reactive sputtering processes"; Thin Solid Films, vol. 356, No. 1, Apr. 2000 (pp. 43-48).
Beach, R.J., "Theory and optimizatio of lens ducts", Applied OPtics, Apr. 20, 1996, vol. 35, No. 12, (pp. 2005-2015).
Response to Office Action filed Mar. 19, 2007, in U.S. Appl. No. 09/903,081.
Final Office Action dated Apr. 13, 2007, in U.S. Appl. No. 09/903,081.
Response to Office Action filed Mar. 1, 2007, in U.S. Appl. No. 11/100,856.
Final Office Action dated May 2, 2007, in U.S. Appl. No. 10/101,863.
Response to Office Action filed Mar. 30, 2007, in U.S. Appl. No. 10/954,182.
Notice of Non-Compliant Amendment dated Apr. 12, 2007, in U.S. Appl. No. 10/954,182.
Response to Notice of Non-Compliant Amendment filed Apr. 23, 2007, in U.S. Appl. No. 10/954,182.
Preliminary Amendment filed Sep. 16, 2005, in U.S. Appl. No. 11/228,834.
Preliminary Amendment filed Jul. 27, 2005, in U.S. Appl. No. 11/191,643.
Corrected Preliminary Amendment filed Sep. 19, 2005, in U.S. Appl. No. 11/191,643.
Affinito et al., "PML/oxide/PML Barrier Layer Performance Differences Arising from Use of UV or Electron Beam Polymerization of the PML Layers," Thin Solid Films vol. 308-309, pp. 19-25 (1997).
Affinito et al., "Polymer-Oxide Transparent Barrier Layers," Society of Vacuum Coaters, 39th Ann. Technical Conference Proceedings, May 5-10, 1996, Philadelphia, PA, pp. 392-397 (1996).
Alder, T. et al., "High-Efficiency Fiber-to-Chip Coupling Using Low-Loss Tapered Single-Mode Fiber," IEEE Photonics Technology Letters, 12(8):1016-1018, (2000).
Almeida, Vilson R. et al., "Nanotaper for compact mode conversion," Optics Letters, 28(15):1302-1304, (2003).
Asghari et al., "ASOC—A Manufacturing Integrated Optics Technology," Part of the SPIE Conference on Integrated Optics Devices III, vol. 3620, pp. 252-262 (Jan. 1999).
Barbier et al, "Amplifying Four-Wavelength Combiner, Based on Erbium/Etterbium-Doped Waveguide Amplifiers and Integrated Splitters", IEEE Photonics Technology Lettters, vol. 9, pp. 315-317 (1997).
Barbier, Denis, "Performances and potentioal applications of erbium doped planar waveguide amplifiers and lasers," GeeO, pp. 58-63 (date unknown).
Belkind et al., "Using pulsed direct current power for reactive sputtering of $Al_2O_3$," J. Vac. Sci. Technol. A 17(4), pp. 1934-1940 (Jul. 1999).
Bestwick, T., "ASOC silicon integrated optics technology," Part of the SPIE Conferences on Photonics Packaging and Integration, SPIE vol. 3631, pp. 182-190 (Jan. 1999).

Borsella et al., "Structural incorporation of silver insoda-lime glass by the ion-exchange process: a photoluminescence spectroscopy study", Applied Physics A 71, pp. 125-132 (2000).
Byer et al., "Nonlinear Optics and Solid-state Lasers," IEEE Journal on Selected Topics in Quantum Electronics, vol. 6, No. 6, pp. 921-929 (Nov. 2000).
Campbell et al., "Titanium dioxide ($TiO_2$)-based gate insulators," IBM J. Res. Develop. 43(3), 383-391, (May 1999).
Chang, C.Y. (edited by), "ULSI Technology," The McGraw-Hill Companies, Inc., New York, 1996, Chapter 4, pp. 169-170, 226-231 (1996).
Chen et al. "Development of Supported Bifunctional Electrocatalysts for Unitized Regenerative Fuel Cells," Journal of the Electrochemical Society, 149(8), A1092-99, (2002).
Choi et al., "Er-Al-codoped silicate planar light waveguide-type amplifier fabricated by radiofrequency sputtering," Optics Letters, vol. 25, No. 4, pp. 263-265 (Feb. 15, 2000).
Cooksey et al. "Predicting Permeability & Transmission Rate for Multilayer Materials," Foodtechnology, vol. 53, No. 9, pp. 60-63 (Sep. 1999).
Delavaux et al., "Integrated optics erbium ytterbium amplifier system in 10 Gb/s fiber transmission experiment", 22nd European Conference on Optical Communication—ECOC' 96, Oslo, 4 pages (1996).
Distiributed Energy Resources: Fuel Cells, Projects, http://www.eere.energy.gov/der/fuel_cells/projects.html (2003).
DuPont Teijin Films, Mylar 200 SBL 300, Product Information (2000).
Electrometals Technologies Limited, Financial Report for the year 2002, Corporate Directory, Chairman's Review, Review of Operations (2002).
E-Tek website: FAQ, Inside E-Tek, E-Tek News, Products; http://www.etek-inc.com/ (2003).
Flytzanis et al, "nonlinear Optics in Composite Materials," E. Wolf, Progress in Optics XXIX (c) Elsevier Scince Publishers B.V., pp. 323-425 (1991).
Frazao et al., "EDFA Gain Flattening Using Long-Period Fibre Gratings Based on the Electric Arc Technique," (date unknown).
Fujii et al, "1.54 mm photoluminescence of $Er^{3+}$ doped into $SiO_2$ films containing Si nanocrystals: Evidence for energy transfer from Si nanocrystals for $Er^{3+}$", Appl. Phys. Lett., vol. 71(9), pp. 1198-1200 (Sep. 1997).
Garcia, C. "Size Dependence of Lifetime and Absorption Cross Section of Si Nanocrystals Embedded in $SiO_2$," Appl. Phys. Lett., vol. 82, No. 10, pp. 1595-1597 (Mar. 10, 2003).
Goossens et al., "Sensitization of $TiO_2$ with p-type semiconductor polymers," Delft Interfaculty Research Center, Delft University of Technology Laboratory of Inorganic Chemistry, The Netherlands (1998).
Han, Hak-Seung et al. "Optical Gain at 1.54 m in Erbium-Doped Silicon Nanocluster Sensitized Waveguide," Appl. Phys. Lett., vol. 79, No. 27, pp. 4568-4570 (Dec. 31, 2001).
Hayakawa et al, "Field enhancement effect of small Ag particles on the fluorescence from $Eu^{3+}$-doped $SiO_2$ glass", Appl. Phys. Lett., vol. 74, No. 11, pp. 1513-1515 (Mar. 15, 1999).
Hayakawa et al., "Enhanced fluorescence from $Eu^{3+}$ owing to surface plasma oscillation of silver particles in glass", Journal of Non-Crystalline Solids, vol. 259, pp. 16-22 (1999).
Hayfield, P.C.S., "Development of a New Material-Monolithic $Ti_4O_7$ Ebonix Ceramic," Royal Society Chemistry, (2002).
Hehlen et al. "Spectroscopic Properties of $Er^{3+}$—and $Yb^{3+}$-doped Soda-Lime Silicate and Aluminosilicate Glasses," Physical Review B, vol. 56, No. 15, pp. 9302-9318 (Oct. 15, 1997).
Hehlen et al. "Uniform Upconversion in High-Concentration $Er^{3+}$-doped Soda Lime Silicate and Aluminosilicate Glasses," Optics Letters, vol. 22, No. 11, pp. 772-774 (Jun. 1, 1997).
Horst et al., "Compact, Tunable Optical Devices in Silicon-Oxynitride Wave Guide Technology," IBM Research Division, 3 pages (1999).
Hubner, J. and Guldberg-Kjaer, S., "Planar Er-and Yb-Doped Amplifiers and Lasers," COM Technical University of Denmark, 10.sup.th European Conf. On Integrated Optics, Session WeB2, pp. 71-74 (2001).

Itoh, M. et al., "Large reduction of singlemode-fibre coupling loss in 1.5% delta planar lightwave circuits using spot-size converters," *Electronics Letters*, 38(2):72-74 (2002).

Jackson et al. "An Accurate Compact EDFA Model," Dept. of Electrical and Computer Engineering, University of BC (date unknown).

Janssen et al. "Photoinduced electron transfer from conjugated polymers onto nanocrystalline $TiO_2$," Eindhoven University of Technology, The Netherlands (date unknown).

Johnson, J.E. et al., "Monolithically Integrated Semiconductor Optical Amplifier and Electroabsorption Modulator with Dual-Waveguide Spot-Size Converter Input," *IEEE Journal of Selected Topics in Quantum Electronics*, vol. 6(1) pp. 19-25 (2000).

Kato et al., "Recent progress on PLC hybrid integration," Part of the SPIE Conference on Optoelectric Integrated Circuits III, SPIE. vol. 3631, pp. 28-36 (Jan. 1999).

Kato, Kuniharu et al., "PLC Hybrid Integration Technology and Its Application to Photonic Components," *IEEE Journal of Selected Topics in Quantum Electronics*, vol. 6(1), pp. 4-13 (2000).

Kelly et al., "Reactive pulsed magnetron sputtering process for alumina films," *J. Vac. Sci. Technol.* A 18(6), pp. 2890-2896 (Nov. 2000).

Kelly et al., "Control of the structure and properties of aluminum oxide coatings deposited by pulsed magnetron sputtering," *J. Vac. Sci. Technol.* A 17(3), pp. 945-953 (May 1999).

Kik, P.G. et al. "Gain Limiting Processes in Er-doped Si Nanocrystal Waveguides in $SiO_2$," *J. Appl. Phys.*, vol. 91, No. 1, pp. 534-536 (Jan. 1, 2002).

Kim et al. "Frequency-dependent pulsed direct current magnetron sputtering of titanium oxide films," *J. Vac. Sci. Technol.* A 19(2); 429-434 (Mar. 2001).

Kim et al. "Mixture Behaviour and Microwave Dielectric Properties in the Low-fired $TiO_2$-CuO System," *Jpn. J. Appl. Phys.*, 39, 2696-2700, (2000).

Ladouceur, F. et al., "Effect of side wall roughness in buried channel waveguides," *IEEE Proc.*, vol. 141, pp. 242-248 (Aug. 1994).

Ladouceur, F. et al., "8.8 Evaluation of Results", *Silica-based Buried Channel Waveguides and Devices.*, Chapman & Hall, London, pp. 98-99 (1996).

Lamb, William B., "Designing Nonfoil Containing Skins for VIP Applications," DuPont VIA Symposium Presenation, (1999).

Lamb, William et al. "Designing Non-Foil Containing Skins for Vacuum InsulationPanel (VIP) Applications," *Vuoto*, vol. XXVIII, No. 1-2—Gennaio-Giugno 1999, pp. 55-58 (1999).

Lange et al, "High Gain Ultra-Short Length Phosphate glass Erbium-Doped Fiber Amplifier Material", *OSA Optical Fiber Communications(OFC)*, 3 pages (2002).

Laporta et al, "Diode-pumped cw bulk Er: Yb: glass laser", *1952 Optics Letters*, vol. 16, No. 24, 6 pages (Dec. 15, 1991).

Laurent-Lund, C. et al., "PECVD Grown Multiple Core Planar Waveguides with Extremely Low Interface Reflections and Losses," *IEEE Photonics Technology Letters*, vol. 10, No. 10, pp. 1431-1433 (Oct. 1998).

Lee et al., "Effect of size and roughness on light transmission in a S/SiO.sub.2 waveguide: Experiments and model," Department of Materials Science and Engineering, Massachusetts Institute of Technology, (Jul. 12, 2000).

Lee et al. "Effects of interfacial layer growth on the electrical characteristics of thin titanium oxide films on silicon," *Applied Physics Letters*, 74(21), 3143-3145, (May 1999).

Love, J.D. et al., "Quantifying Loss Minimisation in Single-Mode Fibre Tapers," *Electronics Letters*, 22(17):912-914 (1986).

Mardare et al. "On the structure of Titanium Oxide Thin Films," *Analele Stiintifice Ale Universitatii AL. I. Cuza IASI*, vol. XLV-XLVI, 201-208 (1999).

Marques, P.V.S. et al., "Planar Silica-on-Silicon Waveguide Lasers Based in Two Layer Core Devices," 10.sup.th European Conference on Integrated Optics, Session WeB2, pp. 79-82 (2001).

Meijerink et al, Luminescence of $AG^+$ in Crystalline and Glassy $SrB_4O_7$, *Journal of Physics and Chemistry of Solids*, vol. 54, No. 8, pp. 901-906, (1993).

Mesnaoui et al, "Spectroscopic properties of $AG^+$ ions in phospage glasses of $NaPO_3$-$AgPO_3$ system", *European Journal of Solid State and Inorganic Chemistry*, vol. 29, pp. 1001-1013, (1992).

Mitomu, O. et al., "Design of a Single-Mode Tapered Waveguide for Low-Loss Chip-to-Fiber Coupling," *IEEE Journal of Quantum Electronics*, 30(8):1787-1793 (1994).

Mizuno et al. "Temperature dependence of oxide decomposition on titanium surfaces in UHV," submitted to Journal of Vacuum Science and Technology, (Oct. 28, 2001).

Ohkubo et al., "Polarization-Insensitive Arrayed-Waveguide Grating Using Pure Si)2 Cladding," Fifth Optoelectronics and Communication Conference (OECC 2000) Technical Digest, 2 pages (Jul. 2000).

Ohmi et al., "Rare earth metal oxides for high-K gate insulator," Tokyo Institute of Technology, (date unknown).

Ohtsuki et al., "Gain Characteristics of a high concentration $Er^{3+}$-doped phosphate glass waveguide", *J. Appl. Phys.* 78(6), pp. 3617-3621 (1995).

Ono et al., "Design of a Low-loss Y-branch Optical Waveguide," Fifth Optoelectronic and Communications Conference (OECC 2000) Technical Digest, 2 pages. (Jul. 2000).

Padmini et al. "Realization of High Tunability Barium Strontium Titanate Thin Films by RF Magnetron Sputtering," College of Engineering, University of California, Santa Barbara (date unknown).

Pan et al., "Planar Er3+-doped aluminosilicate waveguide amplifier with more than 10 dB gain across C-band," Optical Society of America, 3 pages (2000).

Peters et al., "Formation mechanism of silver nanocrystals made by ion irradiation of $Na^+$—$Ag^+$ ion-exchanged sodalime silicate glass", *Nuclear Instruments and Methods in Physics Research B* 168, pp. 237-244 (2000).

Rajarajan, M. et al., "Numerical Study of Spot-Zise Expanders for an Efficient OEIC to SMF Coupling," *IEEE Photonics Technology Letters*, 10(8):1082-1084 (1998).

Ramaswamy et al., "Ion-Exchanged Glass Waveguides: A Review", *Journal of Lightwave Technology*, vol. 6, No. 6, pp. 984-1001 (1988).

Roberts et al., "The Photoluminescence of Erbium-doped Silicon Monoxide," Department of Electronics and Computer Science, 7 pages (Jun. 1996).

Sanyo Vacuum Industries Co., Ltd. Products Info, $TiO_2$, http://www.sanyovac.co.jp/Englishweb/products/ETiO2.htm (2003).

Schermer, R. et al., "Investigation of Mesa Dielectric Waveguides,", Proceedings of the OSA Integrated Photonics Research Topical Meeting and Exhibit, Paper No. IWB3 (Jun. 2001).

Schiller et al. "PVD Coating of Plastic Webs and Sheets with High Rates on Large Areas," European Materials Research Society 1999 Spring Meeting, Strasbourg, France (Jun. 1, 1999).

Second International Symposium of Polymer Surface Modification: Relevance to Adhesion, Preliminary Program (1999).

Seventh International Conference on $TiO_2$ Photocatalysis: Fundamentals & Applications, Toronto, Ontario, Canada, Final Program (Nov. 17-21, 2002).

Sewell, P. et al., "Rib Waveguide Spot-Size Transformers: Modal Properties," *Journal of Lightwave Technology*, 17(5):848-856 (1999).

Shaw et al. "Use of Vapor Deposited Acrlate Coatings to Improve the Barrier Properties of MetallizedFilm," Society of Vacuum Coaters 505/856-7168, 37th Annual Technical Conference Proceedings, pp. 240-244 (1994).

Shin et al. "Dielectric and Electrical Properties of Sputter Grown $(Ba,Sr)TiO_3$ Thin Films," J. Appl. Phys., vol. 86, No. 1, pp. 506-513 (Jul. 1, 1999).

Shmulovich et al., "Recent progress in Erbium-doped waveguide amplifiers," Bell Laboratories, 3 pages (1999).

Slooff et al, "Optical properties of Erbium-doped organic polydentate cage complexes", J. Appl. Phys. 83, pp. 497-503 (Jan. 1998).

Smith, R.E., "Reduced Coupling Loss Using a Tapered-Rib Adiabatic-Following Fiber Coupler," *IEEE Photonics Technology Letters*, 8(8):1052-1054 (1996).

Strohhofer, et al. "Energy transfer to $Er^{3+}$ in Ag ion-exchanged glass", FOM Institute for Atomic and Molecular Physics, 10 pages (date unknown).

Sugiyama et al., "Gas Permeation Through the Pinholes of Plastic Film Laminated with Aluminium Foil," *Vuoto*, vol. XXVIII, N. 1-2—Gennaio-Guigno (1999).

Tervonen, A., "Challenges and opportunities for integrated optics in optical networks," Part of the SPIE Conference in Integrated Optics Devices III, SPIE vol. 3620, pp. 2-11 (Jan. 1999).
Ting et al., "Study of planarized sputter-deposited SiO2," *J. Vac. Sci. Technol.*, 15(3) pp. 1105-1112 (May/Jun. 1978).
Treichel et al., "The influence of pulsed magnetron sputtering on topography and crystallinity of TiO2 films on glass," *Space and Coatings Technology*, vol. 123, pp. 268-272 (2000).
Van Dover, R.B. "Amorphous Lanthanide-Doped $TiO_x$ Dielectric Films," *App. Phys. Lett.*, vol. 74, No. 20, pp. 3041-3043 (May 17, 1999).
Viljanen et al, "Planar Optical Coupling Elements for Multimode Fibers with Two-Step Ion Migration Process", *Applied Physics*, 24, No. 1, pp. 61-63 (Jan. 1981).
Villegas et al, "Optical spectroscopy ofa soda lime glass exchanged with silver", *Physics and Chemistry of Glasses* 37(6), pp. 248-253 (1996).
Von Rottkay et al. "Influence of stoichiometry on electrochromic cerium-titanium oxide compounds," Lawrence Berkeley National Laboratory, UC Berkeley, CA, (date unknown).
Westlinder et al. "Simulation and Dielectric Characterization of Reactive dc Magnetron Cosputtered $(Ta_2O_5)_{1-x}(TiO_2)_x$ Thin Films," *J. Vac. Sci. Technol.* B, vol. 20, No. 3, pp. 855-861 (May/Jun. 2002).
Wilkes, Kenneth T. "Gas Permeation Through Vacuum Barrier Films and its Effect on VIP Thermal Performance, " Vacuum Insulation Panel Symp., Baltimore, Maryland (May 3, 1999).
Yanagawa, H. et al., "Index-and-Dimensional Taper and Its Application to Photonic Devices," *Journal of Lightwave Technology*, 10(5):587-591 (1992).
Yoshikawa, K. et al., "Spray formed aluminium alloys for sputtering targets," *Power Metallurgy*, vol. 43, No. 3 (2000).
Zhang, Hongmei et al. "High Dielectric Strength, High k $TiO_2$ Films by Pulsed DC, Reactive Sputter Deposition," (2001).
Office Action issued on Nov. 28, 2001 in U.S. Patent No. 6,506,289.
Response to Office Action filed on Feb. 20, 2002 in U.S. Patent No. 6,506,289.
Office Action issued on Apr. 17, 2002 in U.S. Patent No. 6,506,289.
Response to Office Action filed on Jul. 17, 2002 in U.S. Patent No. 6,506,289.
Office Action issued on May 2, 2002 in U.S. Patent No. 6,533,907.
Response to Office Action filed on Sep. 3, 2002 in U.S. Patent No. 6,533,907.
Office Action issued on Feb. 12, 2004 in U.S. Appl. No. 09/903,081.
Response to Office Action filed on Aug. 10, 2004 in U.S. Appl. No. 09/903,081.
Office Action issued on Sep. 10, 2004 in U.S. Appl. No. 09/903,081.
Office Action issued on May 14, 2003 in U.S. Appl. No. 10/101,492.
Response to Office Action filed on Aug. 14, 2003 in U.S. Appl. No. 10/101,492.
Office Action issued on Sep. 3, 2003 in U.S. Appl. No. 10/101,492.
Response to Office Action filed on Mar. 3, 2004 in U.S. Appl. No. 10/101,492.
Office Action issued on Feb. 24, 2004 in U.S. Appl. No. 10/101,863.
Response to Office Action filed on Jul. 23, 2004 in U.S. Appl. No. 10/101,863.
Office Action issued on Oct. 6, 2004 in U.S. Appl. No. 10/101,863.
Office Action issued on Oct. 22, 2003 in U.S. Appl. No. 10/101,341.
Response to Office Action filed on Feb. 23, 2004 in U.S. Appl. No. 10/101,341.
Office Action issued on Jun. 10, 2004 in U.S. Appl. No. 10/101,341.
Response to Office Action filed on Dec. 8, 2004 in U.S. Appl. No. 10/101,341.
Office Action issued on May 4, 2004 in U.S. Appl. No. 10/101,493.
International Search Report issued on Nov. 21, 2003 in PCT/US03/24809.
International Search Report issued on Oct. 11, 2004 in PCT/US2004/005531.
Written Opinion issued on Oct. 11, 2004 in PCT/US2004/005531.
Response to Office Action filed Dec. 30, 2008, in U.S. Appl. No. 11/100,856.
Final Office Action mailed Apr. 15, 2009, in U.S. Appl. No. 11/100,856.
Response to Office Action filed Sep. 29, 2008, in U.S. Appl. No. 11/228,834.
Notice of Allowance dated Dec. 30, 2008, in U.S. Appl. No. 11/228,834.
Office Action dated Mar. 30, 2009, in U.S. Appl. No. 11/191,643.
Amendment in Response to Office Action filed Oct. 14, 2009, in U.S. Appl. No. 11/100,856.
Office Action mailed Dec. 15, 2009, in U.S. Appl. No. 11/100,856.
Amendment and Response to Office Action filed Apr. 15, 2010, in U.S. Appl. No. 11/100,856.
Supplemental Notice of Allowance dated Apr. 23, 2009, in U.S. Appl. No. 11/228,834.
Supplemental Notice of Allowance dated Jul. 17, 2008, in U.S. Appl. No. 11/228,717.
Amendment and Response to Office Action filed Sep. 30, 2009, in U.S. Appl. No. 11/191,643.
Notice of Non-Compliant Amendment mailed Nov. 9, 2009, in U.S. Appl. No. 11/191,643.
Response to Notice of Non-Compliant Amendment filed Dec. 9, 2009, in U.S. Appl. No. 11/191,643.
Notice of Non-Compliant Amendment mailed Jan. 25, 2010, in U.S. Appl. No. 11/191,643.
Response to Notice of Non-Compliant Amendment filed Feb. 24, 2010, in U.S. Appl. No. 11/191,643.
Final Office Action dated Apr. 27, 2010, in U.S. Appl. No. 11/191,643.

* cited by examiner

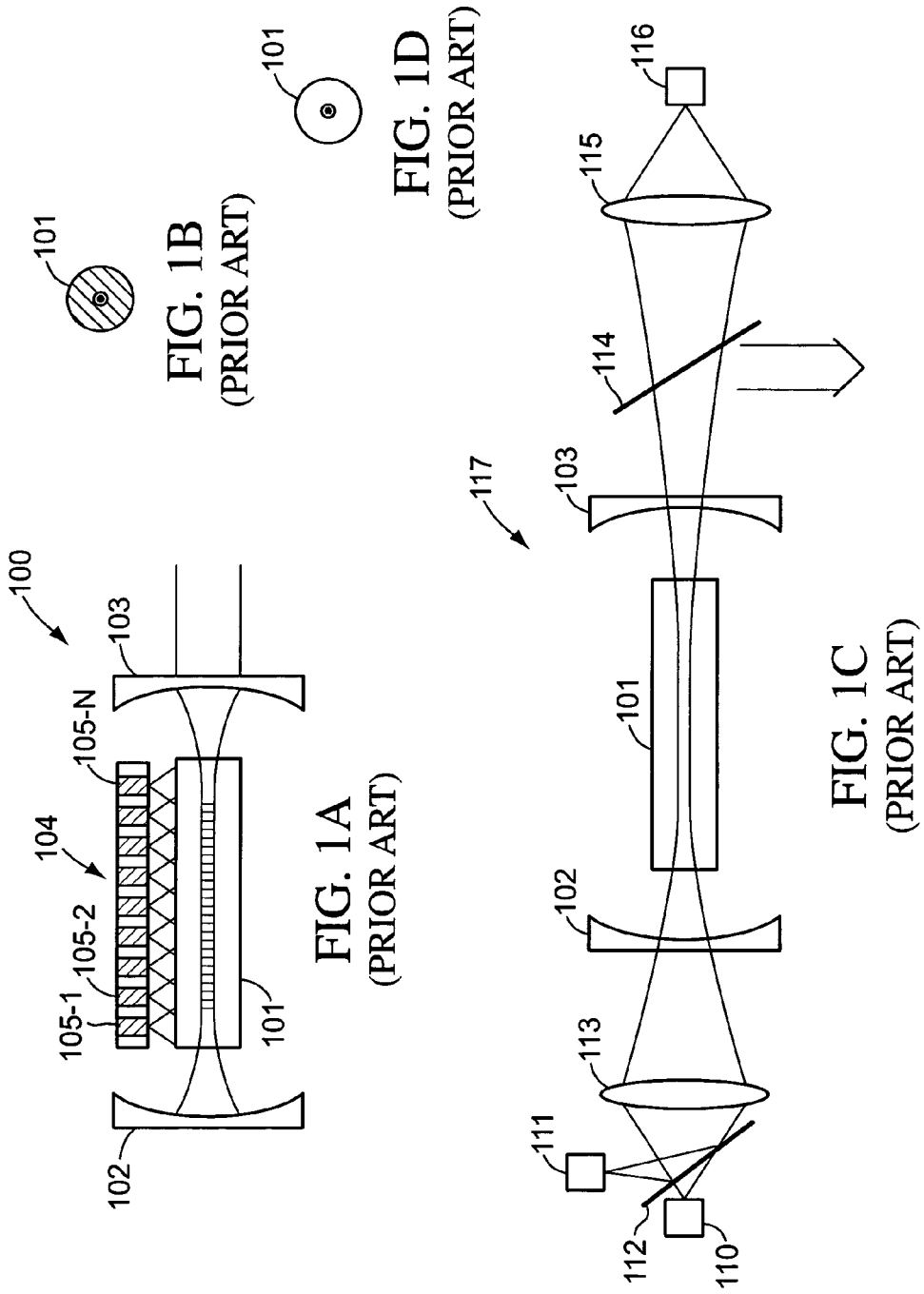

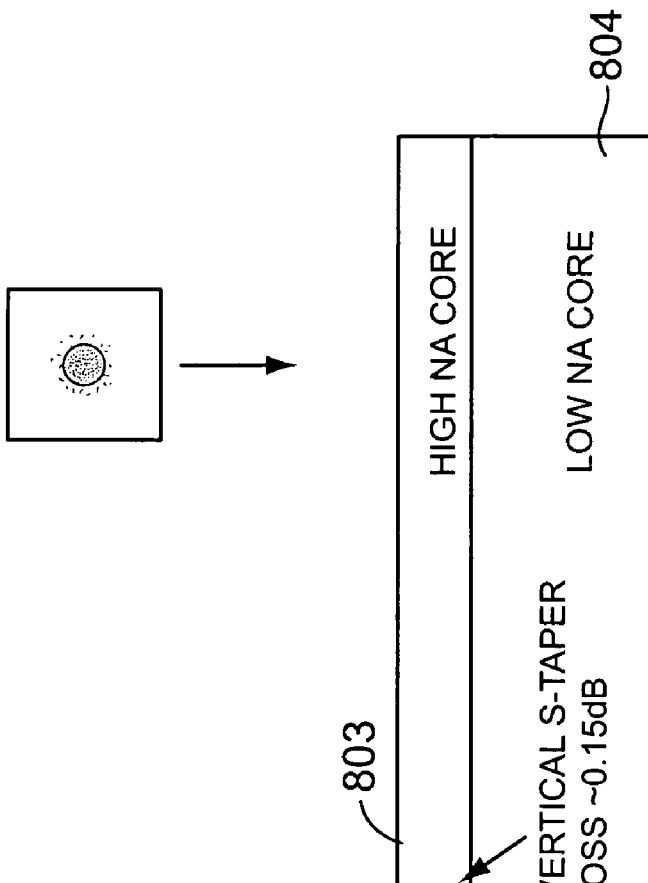
FIG. 10C
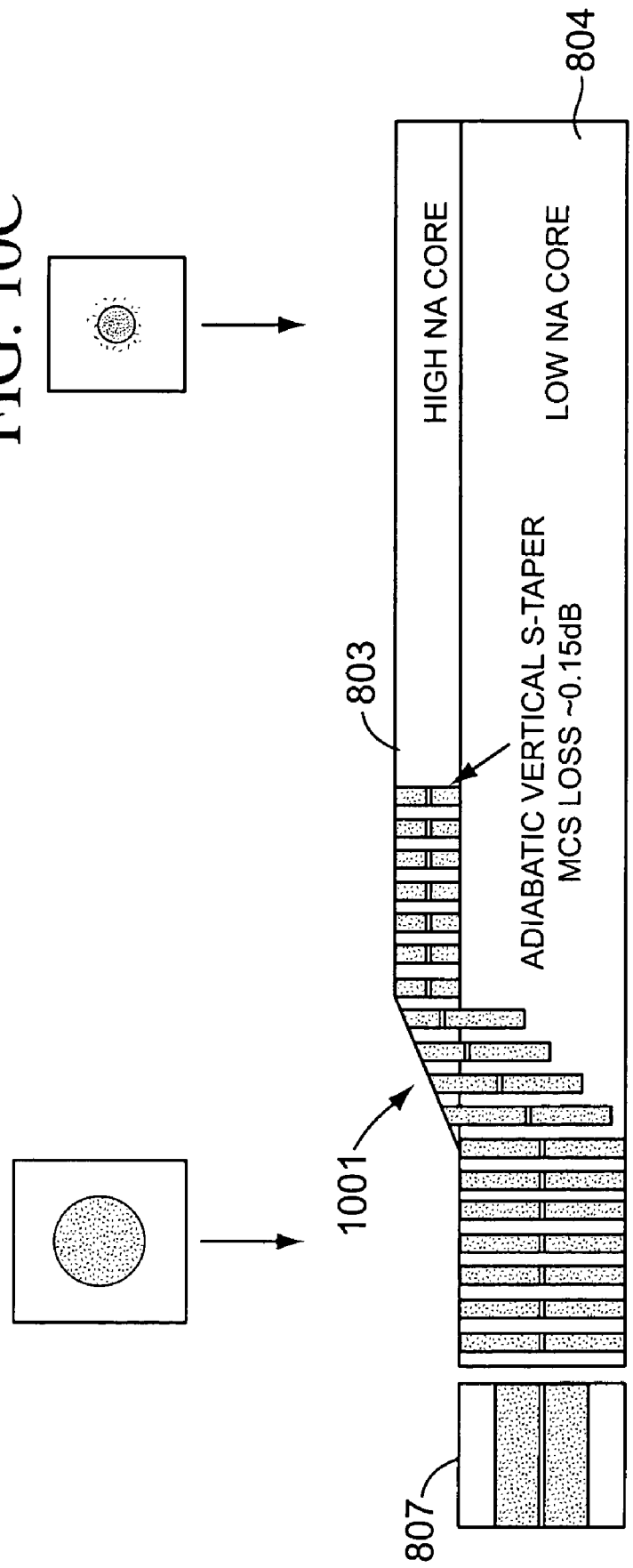
FIG. 10B
FIG. 10A

OPTICALLY COUPLING INTO HIGHLY UNIFORM WAVEGUIDES

RELATED APPLICATIONS

This application claims priority to provisional application Ser. No. 60/406,451, entitled "Efficient Method of Coupling to a Multimode Laser Diode in Order to Optically Pump a Single-Mode Optical Signal Amplifier or Laser," filed Aug. 27, 2002, by David Dawes, herein incorporated by reference in its entirety.

BACKGROUND

1. Technical Area

The present invention relates to coupling of pump light into an optical amplifier or a laser and, in particular, to coupling from a multimode laser diode in order to optically pump an optical amplifier or laser.

2. Discussion of Related Art

Use of directed energy beams, such as those produced by amplifiers or lasers, are diverse and include applications in a wide range of fields, including biotechnology, medicine, semiconductor processing, manufacturing, image recording and defense. In biotechnology, directed energy beams are used, for example, in flow cytometry, DNA sequencing, confocal microscopy, and hematology. Medical applications include use in ophthalmology, non-invasive surgery, and photodynamic therapy. In the semiconductor industry, applications include wafer inspection, rapid thermal processing, and scribing or marking. Image recording applications include, for example, high-speed printing, photo-processing, film subtitling and holography. Industrial applications include, for example, rapid prototyping, materials processing and scribing or marking. Additionally, military applications include range finding, target designation, lidar, and chemical or biological threat detection. The graphics and printing industry, one of the largest businesses in the world, has a need for inexpensive laser systems for use in applications such as thermal graphics. Such applications require a highly reliable, low noise laser or optical amplifier at a low cost.

Typically, applications for directed energy beams require a laser or optical amplifier. An optical amplifier differs from a laser by the absence of a laser cavity. Both devices typically require an active optical material, for example rare-earth doped YAG, ruby ($Al_2O_3$:Cr), or other material, which can be optically "pumped," such that energy can be stored in the excited states of the active atoms or molecules by an optical pump source. Amplification of input optical radiation or stimulated emission for lasing then occurs when the same optical energy stored in the excited states is coupled to the incident optical beam.

FIG. 1A shows an example of a side-pumped laser 100. Laser material 101 is positioned in a laser cavity defined by mirrors 102 and 103 and is pumped by diode array 104. Diode array 104 includes a series of laser diodes 105-1 through 105-N positioned to illuminate all or most of laser material 101. There are a variety of choices for laser diodes and laser diode arrays available to pump Nd or Yb doped YAG, for example. In most applications, Nd:YAG is pumped at about 808 nm and Yb:YAG is pumped at about 940 nm. Choices for diode array 104 include 10-40W arrays, 40-50W single bars, and 240-600W stacked bars, for example. Arrays can also be formed from readily available 1-2W single laser diodes.

FIG. 1B illustrates the optical density in a cross section of laser material 101 in side-pumped laser 100 of FIG. 1A. As is shown in FIG. 1B, the optical density is greatest in the center of laser material 101 where the laser beam is located. However, much of the pump energy is dissipated in areas of laser material 101 that are not actively involved in the lasing process. Therefore, side pumping techniques are inherently inefficient.

As is illustrated in FIG. 1A, the laser beam is directed between mirrors 102 and 103, where a percentage of the beam is transmitted through mirror 103. FIG. 2 illustrates the shape of a laser beam in a laser cavity such as in laser 100. The closer the laser beam is to its diffraction limit in laser material 101, the greater the depth of field and the smaller the diameter of beam handling optics (for example mirrors 102 and 103) required to transmit the beam. The ratio of the divergence of the laser beam to that of a theoretically diffraction limited beam of the same waist size in the $TEM_{00}$ mode is usually given as $M^2=(\Theta/\theta)$, where $\Theta$ is the divergence angle of the laser beam and $\theta$ is the divergence angle of the theoretical laser beam. The angular size of the laser beam in the far field will be $M^2$ times the size calculated for a perfect Gaussian beam, i.e. $\Theta=M^2(2\lambda/W_0)$ for a beam waist diameter of $2W_0$.

FIG. 1C illustrates an end-pumping arrangement for pumping laser material 101. In the arrangement shown in FIG. 1C, laser material 101 is again placed in a laser cavity formed by mirrors 102 and 103. The laser optical energy transmitted through mirror 103 is reflected by a dichroic beam splitter 114 to form the beam. Optical energy from pump source 116 is incident on lens 115 and passes through dichroic beam splitter 114 and mirror 103 to Locus in a nearly diffraction limited region of laser material 101. The beam from pump source 116 is reduced to a size and shape that resembles the shape of the laser beam shown in FIG. 2 in active material 101. Additionally, a second pump source 110 can be focused by lens 113 through mirror 102 and into laser material 101. In some embodiments, additional optical energy can be coupled into laser material 101 from pump source 111 using a polarizing beam splitting cube 112, which transmits light from pump source 110 while reflecting light from pump source 111.

A cross section of laser material 101 illustrating optical power concentration is shown in FIG. 1D. As can be seen in FIG. 1D, nearly all of the pump power, as well as the laser beam, is focused in the active region of laser material 101, where the laser beam produced by laser 117 is produced.

As is pointed out in U.S. Pat. No. 4,710,940 to D. L. Sipes, Jr, issued on Dec. 1, 1987, to a first approximation, and not being limited by theory, the higher the pump power density the more efficient is the use of pump power. This concept is illustrated in the graphs shown in FIGS. 1E and 1F. FIG. 1E shows the photon conversion efficiency (i.e., the number of pump photons versus the number of output laser light photons) with increasing mirror reflectivity at various input optical power densities. Higher mirror reflectivity increases the optical power density within the laser cavity. At higher pump power densities, higher efficiencies result. FIG. 1F shows photon conversion efficiencies as a function of pump power for various spot sizes, which shows the same trend of higher efficiency with optical density as does the graph shown in FIG. 1E. Spot size refers to the diameter of the optical pump in the optically active laser material.

Table I shows typical power usage and lifetime characteristics for a side pumped laser 100 as shown in FIG. 1A, an end-pumped laser 117 as is shown in FIG. 1C, and a lamp pumped laser. As expected, the diode end-pumped laser 117 has the greater efficiency. However, end-pumped laser systems have more optical components and therefore are difficult to align.

Typically, the optical beam from a laser diode outputs is highly assymmetric. Therefore, light from the diodes is difficult to couple into the active material, e.g. laser material 101, of an optical amplifier or a laser. However, as shown in Table I, the lifetimes, efficiency, and expense of various laser diode configurations make them very attractive as pump sources for optically active devices.

TABLE I

|  | Lamp Pumped | Diode End-Pumped | Diode Side-Pumped |
| --- | --- | --- | --- |
| Power to Pump Source | 5000 W | 2.5 W | 50 W |
| Power to Cooling System | 500 W | 2.5 W | 50 W |
| Power from Pump Source | 3500 W | 1.25 W | 20 W |
| Single-Mode Power from Laser | 10 W | 0.8 W | 10 W |
| Wall-Plug Efficiency | 0.2% | 16% | 10% |
| Cooling | Water | Free Air | Forced Air |
| Power Consumed/Output kW-hr | 500 kW-hr | 6.5 kW-hr | 10 kW-hr |
| Cost of Light Source | $200 | $400 | $1000 |
| Lifetime of Light Source | 200 hrs | 20,000 hrs | 10,000 hrs |

Multimode laser diodes are highly desirable optical pump sources as they are inexpensive to manufacture and are capable of producing much higher power levels than single mode lasers. Multimode lasers are more reliable than single-mode lasers as they have lower output power densities reducing the risk of catastrophic facet damage, the primary cause of laser diode failure. However the light emitted by a multimode laser diode is very asymmetric. Typically, the laser diode emitting aperture has dimensions on the order of 1 µm×100 µm. It is very difficult and costly to collect and couple light emitted by a multimode laser diode into the end facet of a single-mode optical waveguide or fiber.

Most conventional waveguide amplifiers and lasers include one or more waveguide cores doped with active elements, such as Er, Yb, Nd and Tm, and are designed such that the waveguide can support coaxially propagating single-mode output and pump light. The output power of a single-mode, single laser pumped amplifier or laser is often limited to about 20 dBm (100 mW) by the power levels of available single-mode pump lasers. Single-mode pump lasers require more precision manufacturing tolerances and are consequently more expensive to produce than multimode lasers. As a result complex and costly schemes are required to pump arrays of waveguide optical amplifiers and lasers. Pump light has to be distributed to each amplifier channel or laser element, requiring combinations of splitters, combiners, taps, monitors and associated control electronics to effectively manage the distribution. Polarization sensitivity of waveguide elements further complicates the distribution process.

Therefore, there is a need for optical laser devices capable of efficiently coupling light from a laser diode into the active region of a laser cavity that is cost effective and reliable, and that produces high optical output power.

SUMMARY

In accordance with the present invention, an optical waveguide device that couples light from at least one laser diode into a high refractive index contrast slab waveguide is presented. In some embodiments, the high refractive index contrast slab waveguide includes a light duct in a horizontal plane in order to receive light from the at least one laser diode. In some embodiments, the high refractive index contrast slab waveguide includes a high refractive index active waveguide and an intermediate refractive index passive cladding.

In some embodiments, the high refractive index contrast slab waveguide is folded in a horizontal axis. In some embodiments, the intermediate passive cladding is thick enough in the vertical axis to capture a substantial amount of light from the at least one laser diode in the vertical direction. In some embodiments, light transmitted from the optical waveguide device is efficiently coupled into single mode optical fibers by mode size converters.

These and other aspects of the present invention are further described in the following figures.

SHORT DESCRIPTION OF THE FIGURES

FIGS. 1A and 1B illustrate a side-pumped solid-state laser.

FIGS. 1C and 1D illustrate an end-pumped solid-state laser.

FIGS. 10A, 10B, and 10C illustrate an efficient mode size conversion for vertical pumping of an amplifier core.

Figure 11:
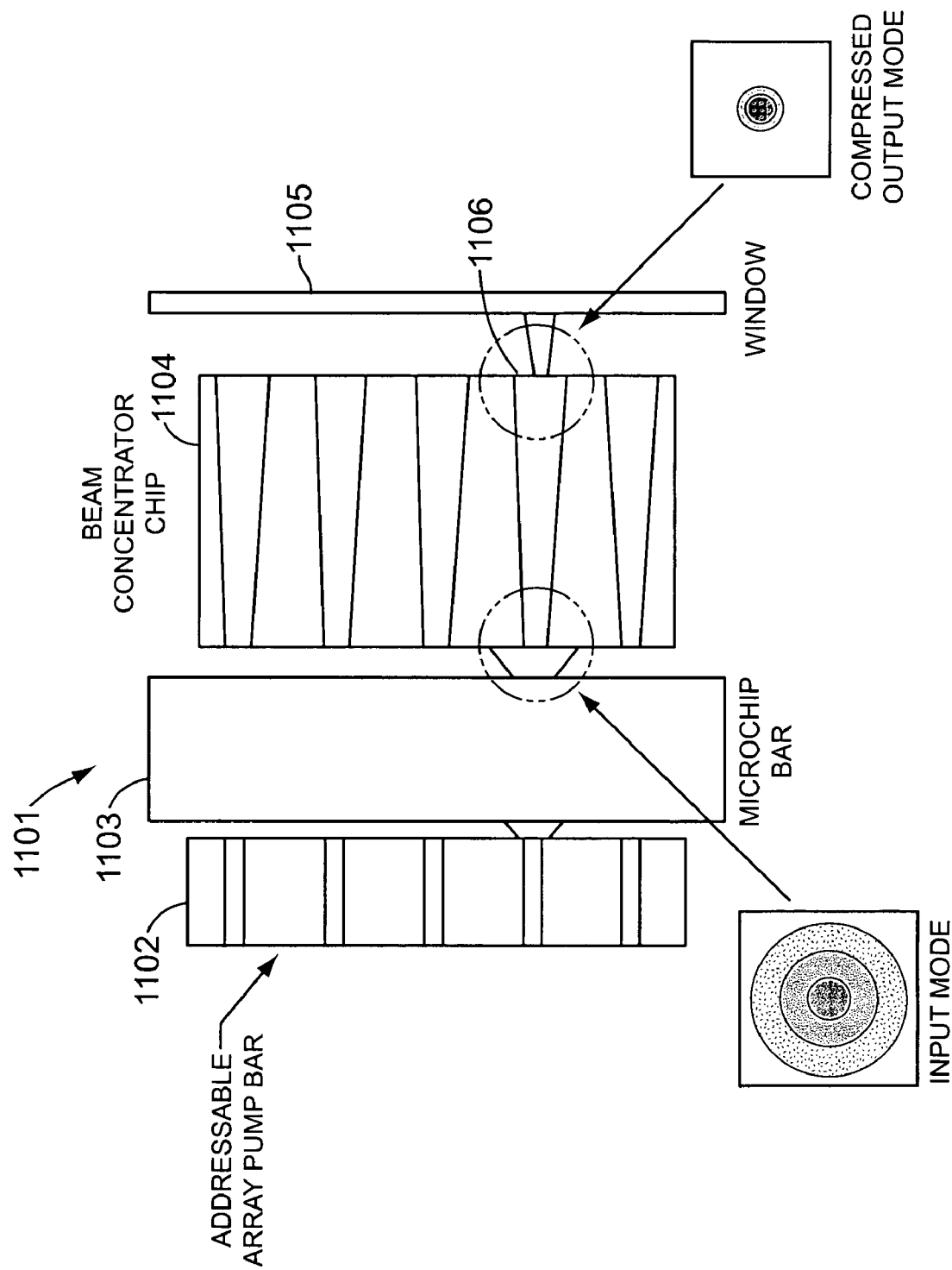

FIG. 11 illustrates a monolithic array beam concentrator chip according to the present invention.

Figure 12A:
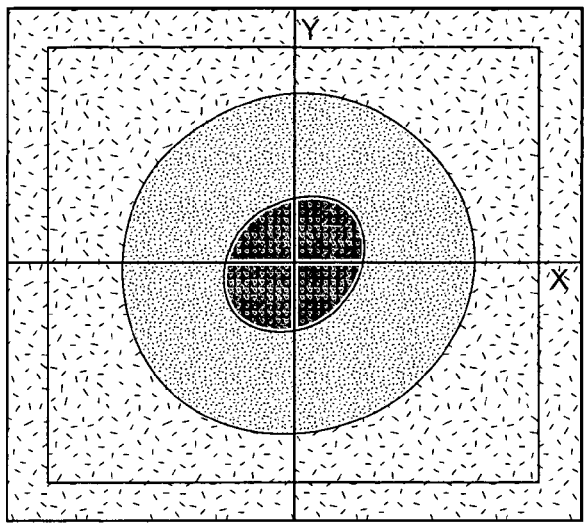
Figure 12B:
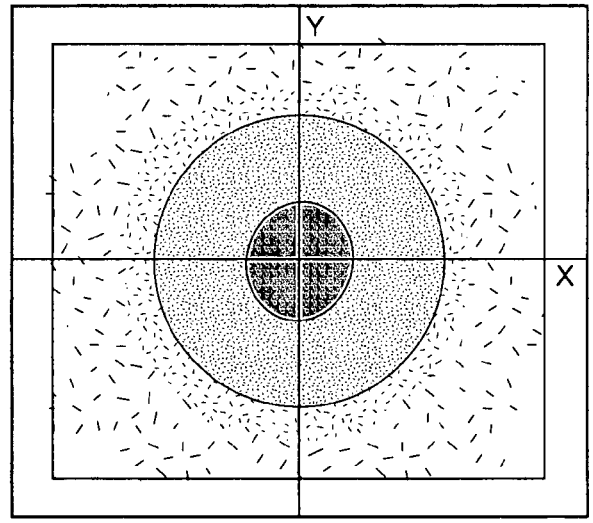

FIGS. 12A and 12B illustrate the mode images for two example waveguides according to the present invention.

Figure 13:
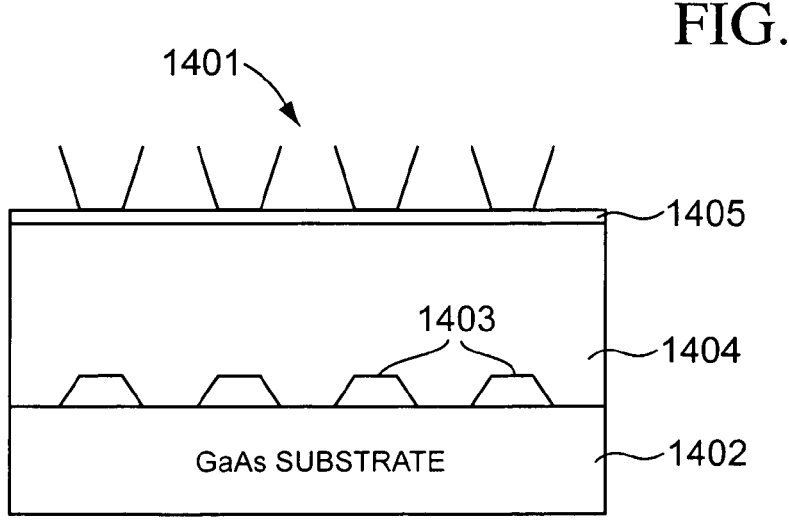

FIG. 13 illustrates a Vertical Cavity Surface Emitting Laser (VCSEL) pumped microchip laser according to the present invention.

DETAILED DESCRIPTION

Lasers and other light sources have great utility when able to produce high optical power densities The speed and effectiveness of the interaction of laser power or energy with materials is in direct proportion to the brightness and intensity of the power or energy that the laser can deliver to the material. The highest brightness or intensity of a laser output beam is obtained when the beam is confined to the fundamental, lowest order transverse electromagnetic mode ($TEM_{00}$). Therefore, single transverse mode is the highest brightness form of a laser's output, which is the laser's most desirable property.

In accordance with some embodiments of the present invention, a high refractive index contrast multimode slab waveguide of an appropriate design to collect and contain a high proportion of the light emitted by a single or multi-element multi-mode pump laser diode and efficiently couple that light into an assembly of actively doped single-mode waveguides embedded within the slab is presented. The light from the pump source, then, is efficiently coupled into one or more active regions through the effects of the differences in refractive index between the slab material of the waveguide and the cladding material around the slab. Both the slab material and the cladding material can be deposited with a high degree of uniformity and control in order to obtain the coupling. Further, the embedded active core material of the waveguide can also be manufactured with a high degree of uniformity and control.

In some embodiments of the invention, long, single-mode waveguides are folded many times to accommodate lengths greater than the dimensions of the pumped, encapsulating multimode slab waveguide. The single-mode waveguide cores can be folded in such a manner as to optimize the effective absorption cross-section they present to the guided multimode pump light flux while minimizing losses due to bending experienced by propagating single-mode signal light. The efficiency of absorption of pump light from the multimode laser diodes by single-mode actively doped waveguide cores is a function of the ratio of the effective cross-section areas of the single-mode and multimode waveguides.

In some embodiments of the invention, the multimode slab waveguide itself is pumped. This effect can result in a slab light source.

In some embodiments, the dimension of the multimode slab waveguide enables conservation of high power densities of the light emitted by the pump laser diode elements, while not increasing the difficulty and reducing the effectiveness of direct coupling between the laser diodes and the edge facet of the slab waveguide. High pump power densities are particularly important for three-level active systems where natural ground state absorption must first be bleached out before gain can be achieved.

In some embodiments single-mode light emitted by the laser diode in its fast axis direction (i.e., the direction of larger laser beam divergence) is converted to multiple-mode light immediately after the light enters a slab waveguide, thereby limiting the return path for pump energy to the pump laser source. Such an arrangement increases the pumping efficiency because more light is available for pumping.

Lasing and optical amplification processes are processes of energy conversion. Energy is pumped into exciting active elements in the active material, where the energy is stored, from any energy source, commonly optical, which is capable of exciting the active elements. Energy stored in the excited active elements, then, is released when the excited active element is induced by a signal, such as when the active element is perturbed by presence of another photon, into releasing the energy in the form of an optical photon. For example, energy from the excited states of a laser material is released in a highly coherent form by stimulated emission. The efficiency of the conversion process is a key factor in determining the cost-effectiveness of a particular laser or optical amplification or conversion process.

Planar waveguide forms of optical amplifiers and lasers are desirable as they are very compact compared to other forms of optical amplifiers and lasers. In addition, a planar waveguide form potentially allows the integration of diverse optical and electronic functions on, for example, silicon wafers which can be manufactured in high volumes and at low cost with processes commonly used in the semiconductor-industry. In addition to waveguides, slab emitters are desirable as efficient light sources.

Figure 1E:
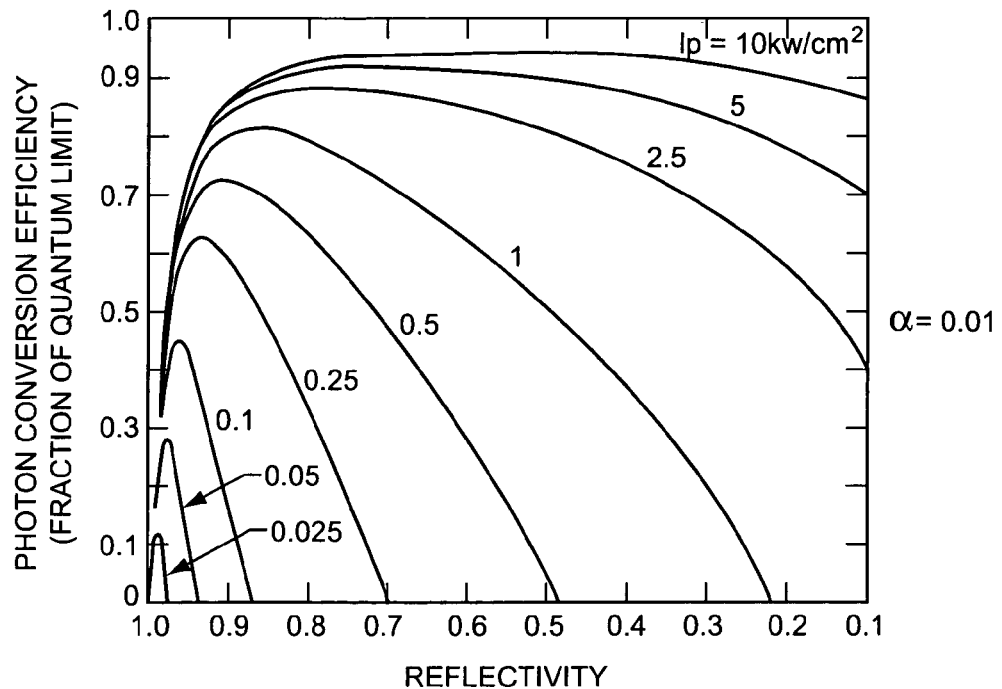
FIGS. 1E and 1F show graphs illustrating higher pump efficiency with higher optical densities.
Figure 1F:
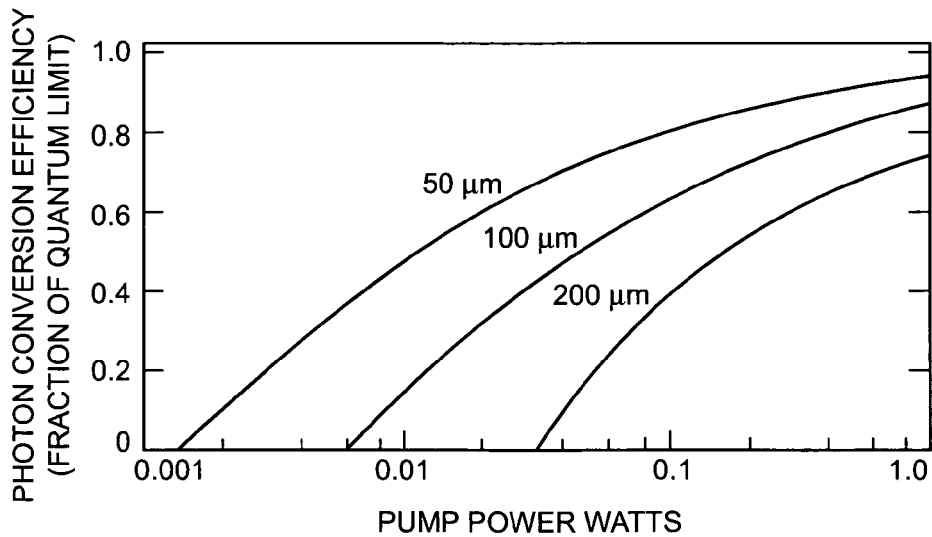
Figure 2:
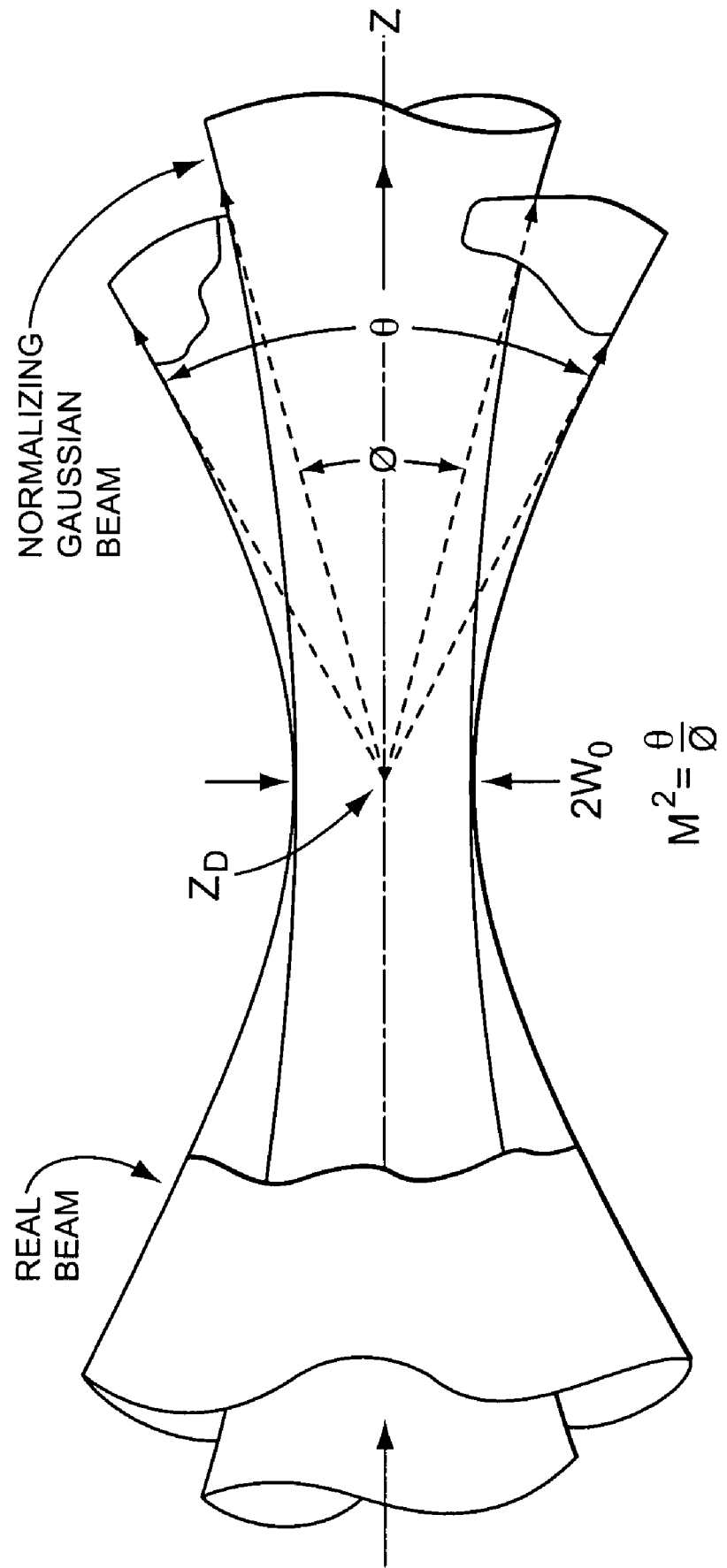
FIG. 2 illustrates the characteristics of a typical laser beam in a laser cavity.
Figure 3A:
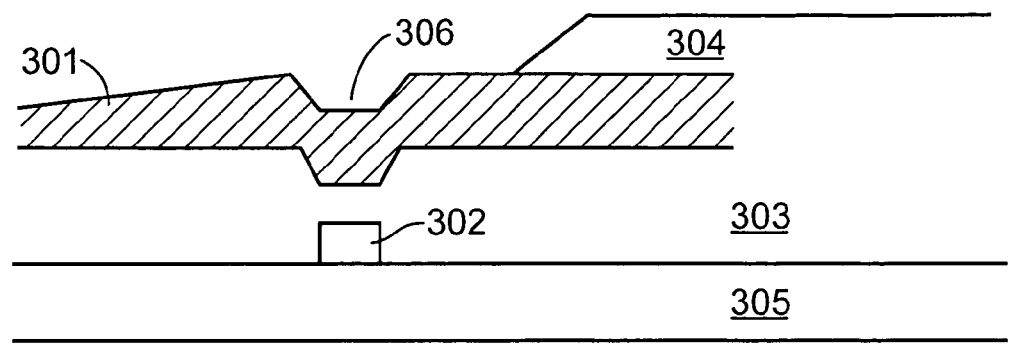
FIGS. 3A and 3B illustrate integration of photodetectors and laser diodes with planar waveguides.

FIG. 3A, for example, illustrates integration of an optical waveguide 301 with a photodetector, which may be a photodiode (PD). Photodiode 302 is formed on semiconducting layer 305. An optical layer 303 is formed over photodiode 302 and waveguide 301 is formed on optical layer 303. Light traveling through waveguide 301 can be coupled onto photodiode 302 at coupler 306.

Figure 3B:
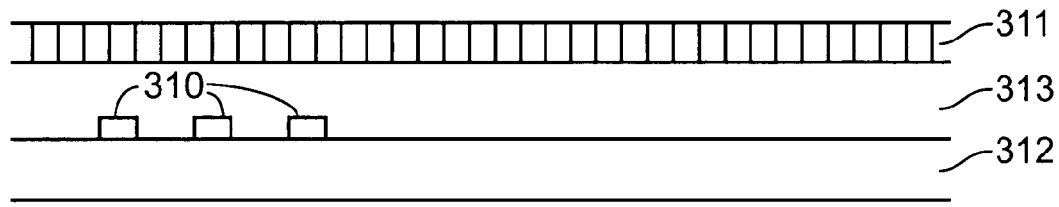

FIG. 3B illustrates integration of pump laser diodes 310 with an active material waveguide 311. As shown in FIG. 3B, laser waveguide 311 is formed on an optical layer 313. Optical layer 313 is formed over laser diodes 310, which are formed on semiconducting layer 312. In some embodiments, laser diodes 310 can be formed to the side of optical waveguide 311, over optical waveguide 311, or in any other orientation with respect to optical waveguide 311 that allows pumping of the active dopant ions of optical waveguide 311.

Figure 4:
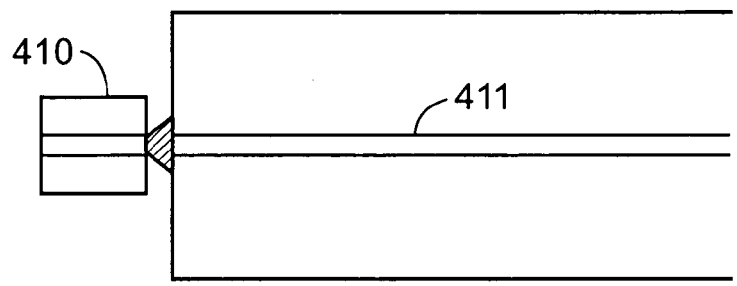
FIG. 4 illustrates a butt-coupling technique for optically coupling between a laser diode and a waveguide.

FIG. 4 illustrates coupling of a laser diode chip 410 with a high refractive index contrast ($\Delta n$) waveguide 411. The method of coupling illustrated in FIG. 4 is referred to as "butt coupling," where laser diode 410 is a single-mode semiconductor laser diode output facet positioned to within about 5 μm of high $\Delta n$ rectangular waveguide 411 in order to correct for mode astigmatism, thereby reducing coupling loss. In some embodiments, about a 50% coupling can be achieved with this method utilizing uncoated facets. Unfortunately, customer demand is for greater than 80-85% coupling efficiency for laser diodes with complex, non-gaussian mode output profiles. Therefore, conventional butt-coupling techniques are not meeting customer demand.

Figure 5A:
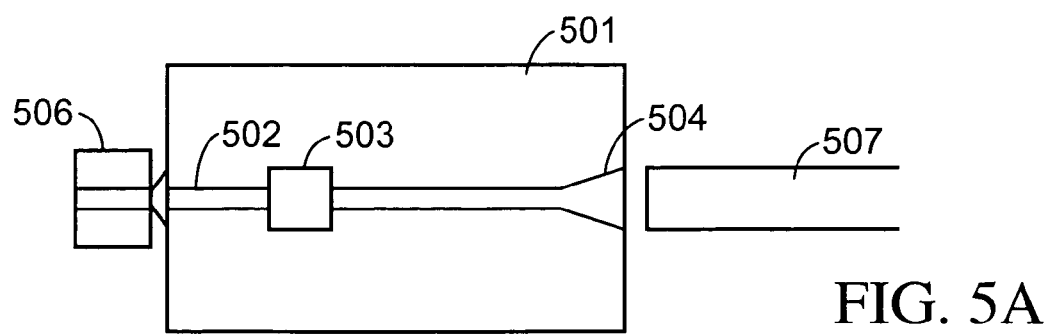
FIGS. 5A, 5B and 5C illustrate integrated coupling chips for coupling optical energy from a single mode laser diode chip.

FIG. 5A illustrates a laser coupling chip 501 that couples light from a laser diode 506 to an optical fiber 507. Coupling chip 501 includes a waveguide 502 with an integrated photodiode 503 to allow for down-stream power monitoring. In some embodiments, photodiode 503 may couple about 0.02 dB to about 0.05 dB of the optical power in waveguide 502 to provide optical coupling. A dual-core mode size converter 504 can be formed in coupling chip 501 to optimize for efficient optical coupling to optical fiber 507. Dual-core mode size converter 504 can couple light to optical fiber with a coupling loss of about 0.25 dB. The resulting total loss of less than 1 dB in laser coupling chip 501 results in a greater than 80% coupling efficiency between laser diode 506 and optical fiber 507. However, there remains the problem that the coupling efficiency between laser diode 506 and coupling chip 501 is less than 80%.

In some embodiments, coupling chip 501 can be formed on a millimeter-scale chip sized to fit a standard 14-pin butterfly package. Further, in order to achieve optimum coupling efficiencies, the slow-axis and fast-axis alignment between laser diode 506 and coupling chip 501 requires sub-micron positioning precision.

Figure 5B:
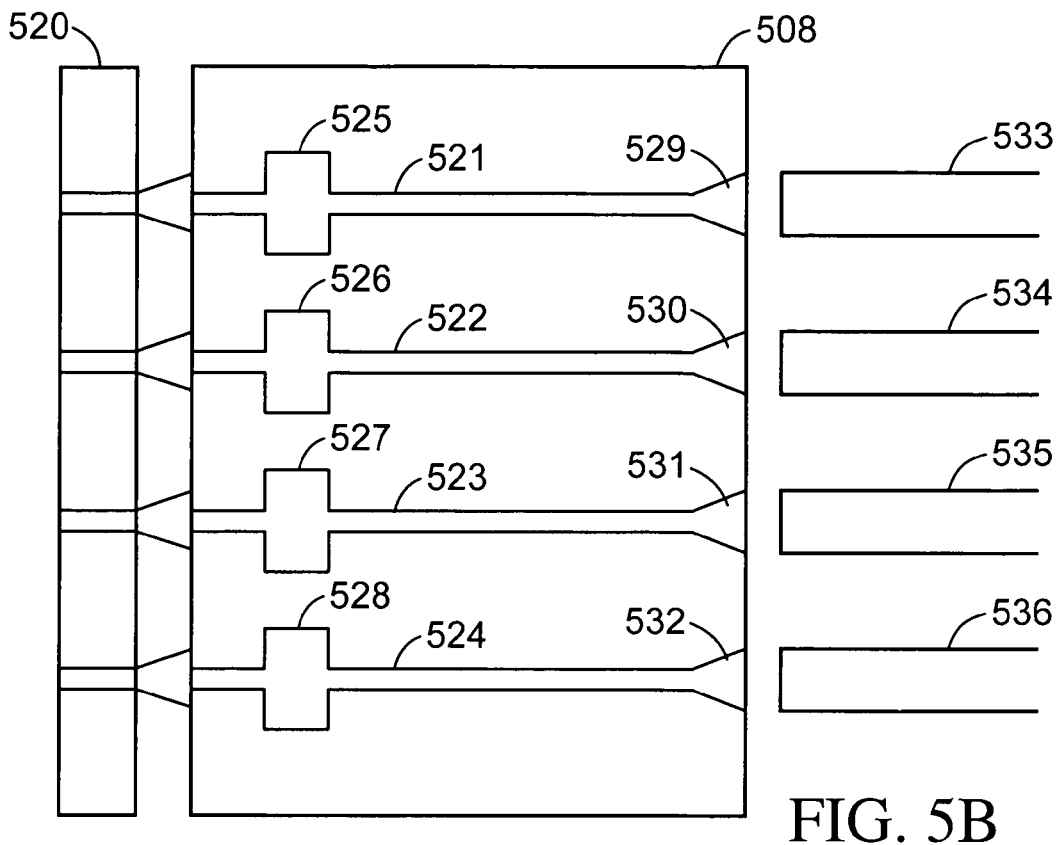
Figure 5C:
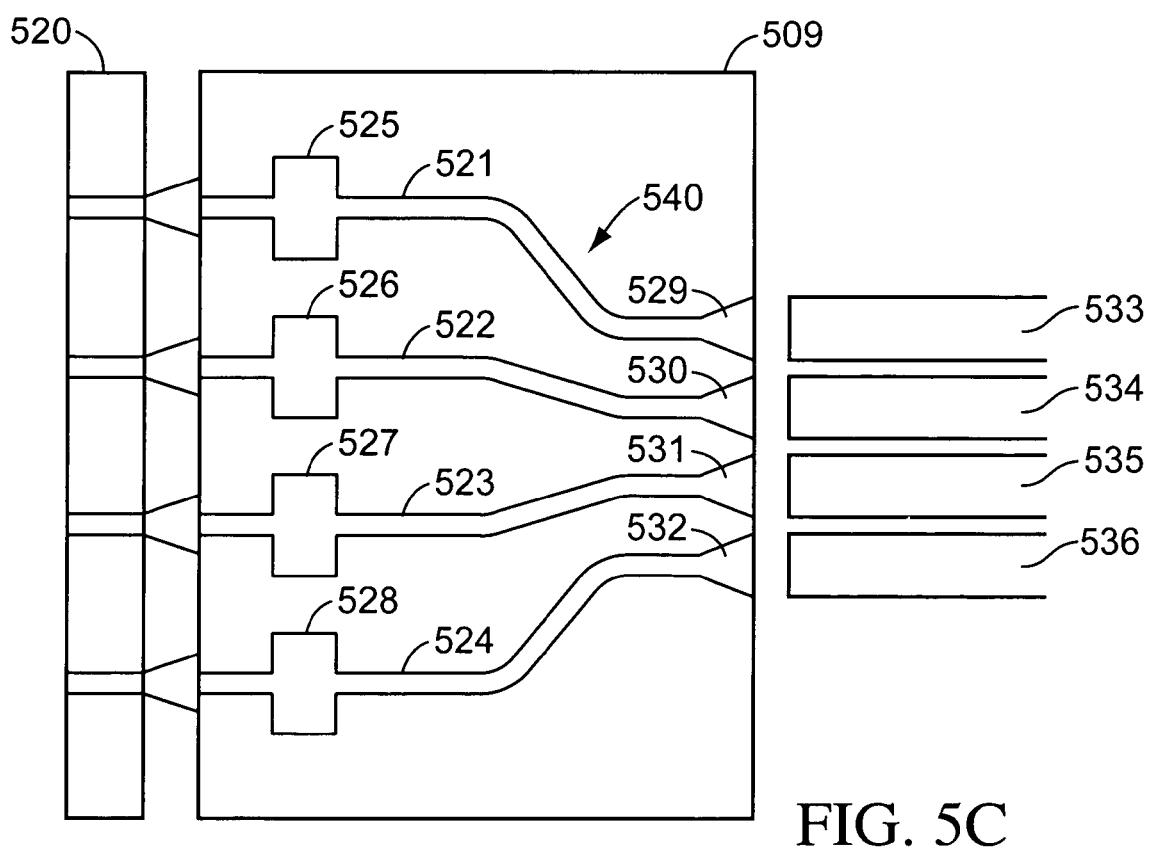

FIG. 5B shows a single mode laser diode array coupler chip 508. Light from laser diode array 520 is coupled into waveguides 521, 522, 523, and 524. Waveguides 521, 522, 523 and 524 are each integrated with a photodetector 525, 526, 527, and 528, respectively, as is discussed above with regard to FIG. 5A. Further, mode size converters 529, 530, 531, and 532 formed in waveguides 521, 522, 523, and 524, respectively, efficiently couple light into optical fibers 533, 534, 535, and 536, respectively. Light from diode array 520, then, is coupled through optical fibers 521, 522, 523, and 524 into optical fibers 533, 534, 535, and 536. FIG. 5C shows a single mode laser diode array coupler chip 509 similar to diode array coupler chip 508 with a pitch size converter 540, which provides for closer packing of optical fibers 533, 534, 535, and 536.

Other pumping schemes are described, for example, in U.S. Pat. No. 6,236,793, issued to Lawrence et al. on May 22, 2001; U.S. Pat. No. 4,710,940, issued to Sipes; U.S. Pat. No. 4,785,459 issued to Baer on Nov. 15, 1988; and at Lawrence Livermore National Labs. In a system proposed by Lawrence, et al., the pump light is reflected into the active waveguide core by reflecting the pump beam from a prism. Signal power is then transmitted through the prism into the waveguide core. However, in this configuration alignment of the optics directing the pump power into the waveguide core for efficient pumping needs to be arranged such that the waist of the beam is incident on the waveguide core. This results in a large alignment problem for efficiently coupling the pump power into the waveguide core. The arrangement proposed by Sipes involves an array of laser diodes arranged along the corners of a pumping path, for example a zig-zag pattern, such that pump power from multiple laser diodes are coupled into an active waveguide. The arrangement proposed by Baer includes a side pumped active material block with zig-zagging of the signal bea, through the active material for maximum interaction.

Lawrence Livermore National Labs has proposed a high output Yb:YAG laser system that utilizes a diode bar stack and a lens duct that brings the pump light from the diode bar stack into a Yb:YAG laser rod. About an 80% coupling efficiency can be achieved in this fashion. However, this solution requires a bulk laser rod and a large lens duct to direct light from the diode bar stack into the laser rod.

Figure 6A:
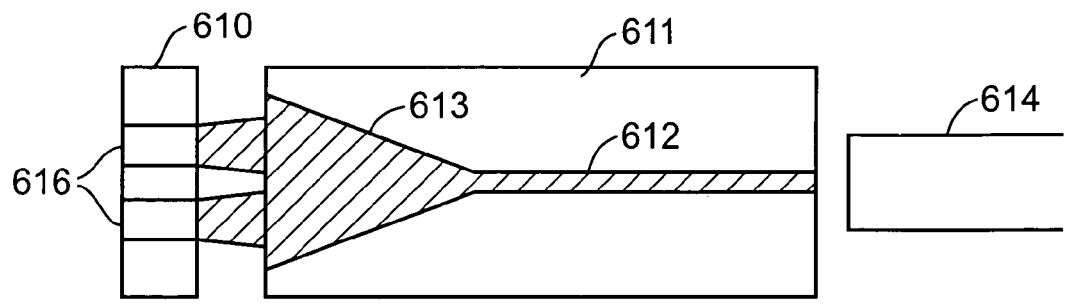
FIGS. 6A and 6B illustrate a coupling chip for coupling optical energy from a multi-mode laser diode array to a multi-mode optical fiber in accordance with the present invention.
Figure 6B:
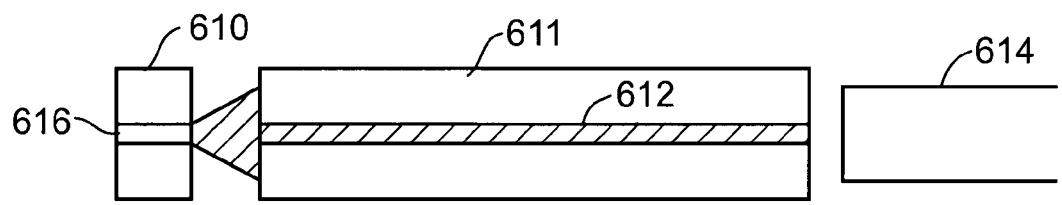

Some embodiments of the present invention can utilize multimode laser diodes in the form of single elements or arrays, to efficiently pump compact, single-mode, planar waveguide optical amplifiers, lasers, and slab devices, which can be integrated with other optical and electronic functions and manufactured inexpensively in high volumes with semiconductor industry techniques. As shown in FIGS. 6A and 6B, the output light from a multimode laser diode 610 is single-mode in the vertical plane (the fast axis) and multimode in the horizontal plane (the slow axis). Therefore, the output beam diverges very rapidly in the vertical axis (the fast axis) but slowly diverges in the horizontal plane (the slow axis).

FIGS. 6A and 6B illustrate coupling of light from a laser diode array into a planar waveguide in accordance with the present invention. As shown in FIGS. 6A and 6B, the light beam from laser diodes 616 of multimode laser diode array 610 diverges less in the slow axis direction (shown in FIG. 6A) than it does in the fast axis direction (shown in FIG. 6B). The output beams from laser diode array 610 diverge more in the vertical axis (shown in FIG. 6B) than in the horizontal axis (shown in FIG. 6A). Embodiments of the present invention take advantage of the slow divergence in the horizontal axis to increase the optical density in high refractive index waveguide 612. Coupling chip 611 can include a large lens duct 613 to direct light into high refractive index waveguide 612. The material of waveguide 612 and lens duct 613 can be the same material and can be deposited and patterned on a substrate in the same series of processing steps. Light from waveguide 612 can then be coupled into multimode fiber 614.

A higher optical power density, then, can be achieved utilizing less expensive multimode laser diode bars, rather than single mode laser diode arrays, and coupling the optical output from multiple ones of the laser diodes in diode array 610 into waveguide 612. Higher coupling efficiency is achieved by utilizing a light duct 613 formed with waveguide 612. Further, the horizontal alignment between diode array 610 and coupling chip 611 is not critical, so long as the light beams are directed toward duct 613. As shown in FIG. 6B, alignment in the vertical axis (i.e., the fast axis) is somewhat critical because of the large divergence of the light output from diode array 610 in that direction.

The pump light from the laser diode can be constrained within the confines of the high $\Delta n$ slab waveguide and therefore no critical alignment exists between the laser diode and the active waveguide, as would be true for conventional pumping configurations as has been discussed above. Further, there is no need to maintain single-mode propagation in the horizontal direction, as alignment tolerance are relaxed in the horizontal plane. In the vertical plane, a single optical mode can be excited to obtain maximum power density by using more precise alignment. When maximize power density is not required, the alignment tolerances in the vertical plane can also be relieved by using a thicker high refractive index contrast slab waveguide and allowing the light to propagate multimode in the vertical direction as well.

Figure 7A:
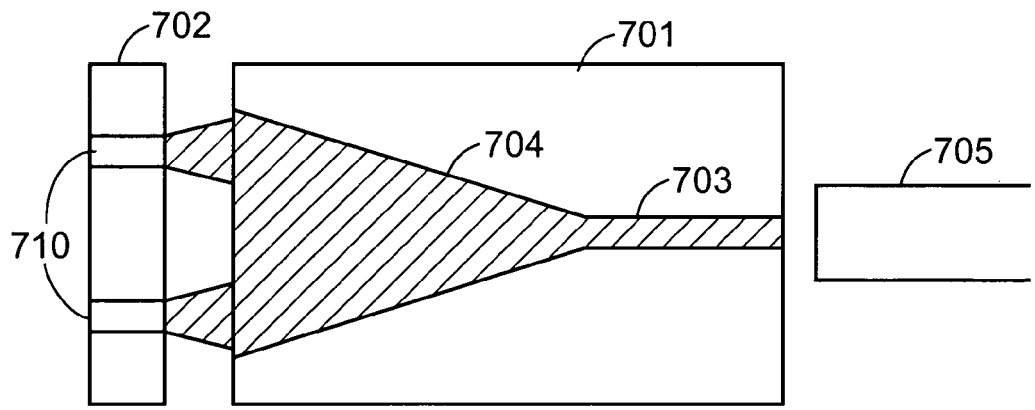
FIGS. 7A and 7B illustrate a coupling chip for coupling optical energy from a multi-mode laser diode array to a single mode optical fiber in accordance with the present invention.
Figure 7B:
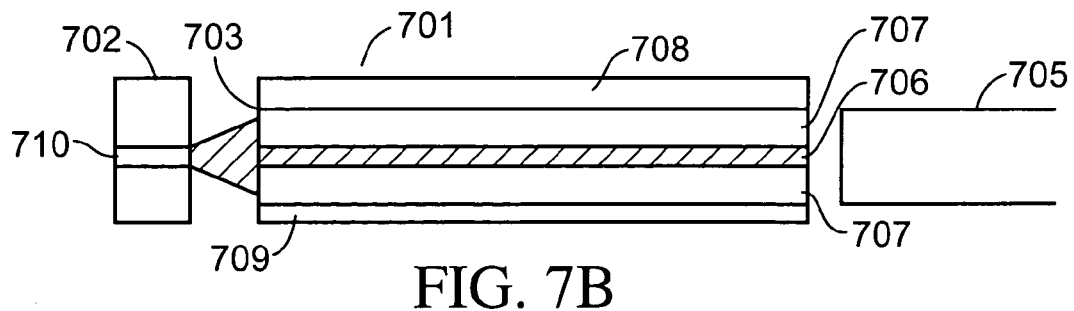

FIGS. 7A and 7B illustrate coupling utilizing a double-clad core. As shown in FIG. 7A, light from one or more laser diodes 710 of multimode pump diode array 702 is coupled into waveguide 703 of coupling chip 701. Again, a lens duct 704 can be formed with waveguide 703 to direct light from laser diodes 710 in diode array 702 into waveguide 703. In coupling chip 701, light from waveguide 703 can be coupled into single-mode fiber 705.

FIG. 7B shows a cross-section of waveguide 703. Waveguide 703 includes a single-mode core 706. Single-mode core 706 can be formed, for example, from rare-earth doped $Al_2O_3$, $Y_2O_3$, or $TiO_2$ to form a high refractive index core. Single-mode core 706 can be surrounded by a multimode cladding 707 having a lower refractive index than that of single-mode core 706, which can be formed from an intermediate refractive index contrast material such as $Al_2O_3$ or $Y_2O_3$. In some embodiments, the dimensions of multi-mode cladding 707 can capture most or all of the light output from laser diode array 702. Waveguide 703 can be formed on, for example, a silica or aluminosilicate buffer layer 709 deposited on a substrate. A second buffer layer 708 can be formed over waveguide 703.

In this way, coupling chip 701 can provide efficient conversion of low optical power density light emitted from directly-coupled multimode laser diode bars to high optical power density. Where high-refractive index contrast core 706 is optically active, a laser can be formed by including a laser cavity, which can be formed by depositing mirrors on the ends of chip 701.

Very high optical-to-optical efficiencies (e.g., greater than 80%) can be achieved in coupling chip 701. For example, a multimode laser diode operating at a wavelength of 920 nm, is efficiently coupled into a single-mode output laser at about 1100 nm utilizing an active waveguide 706 formed from double-clad Yb-doped silica, for example.

Having efficiently coupled the multimode pump light into a high refractive index slab waveguide which is multimode in the horizontal plane and may or may not be single mode in the vertical plane, a single mode active waveguide located in the high refractive index portion of the slab will be efficiently pumped. Such active areas are shown, for example, in FIGS. 8A and 8B. In some embodiments, the active region of the waveguide can be "folded" or routed through many loops in order to increase the length of active material pumped and thereby increase the amplification in the waveguide.

Figure 8A:
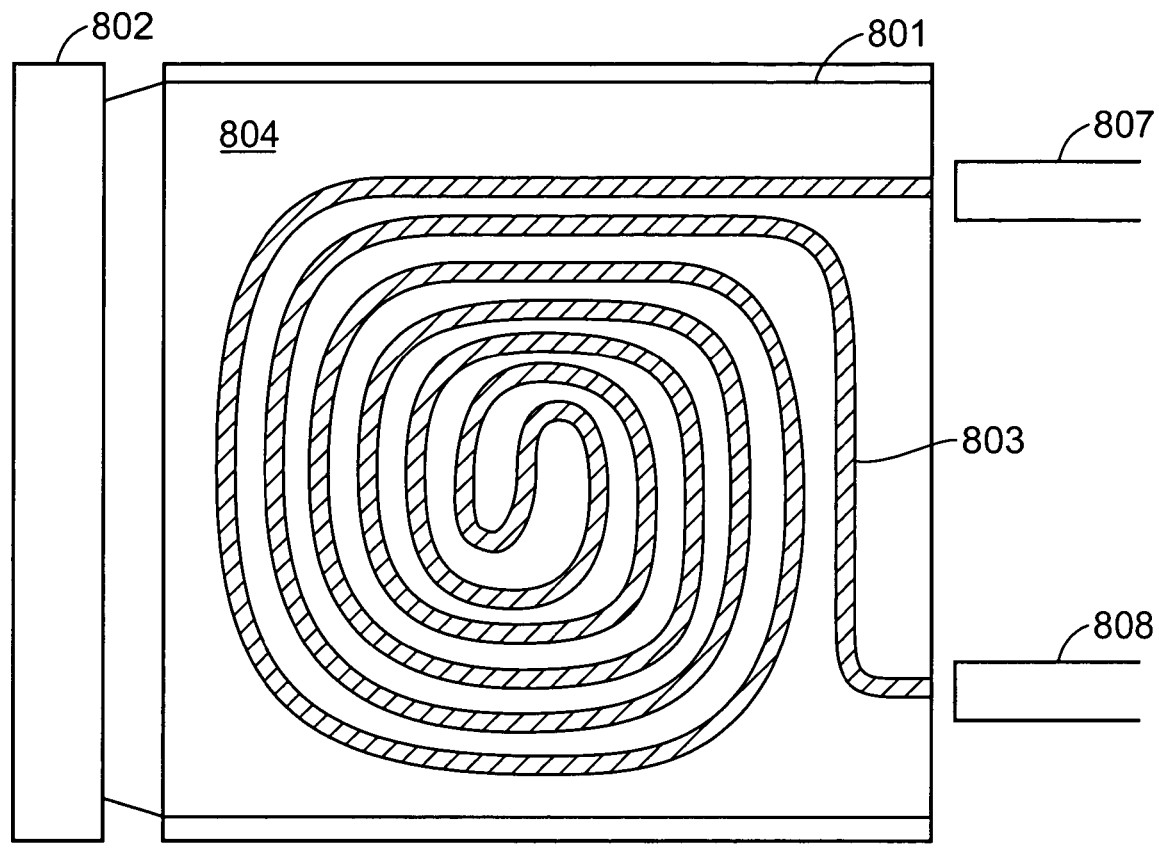
FIGS. 8A and 8B illustrate an embodiment of an amplifier chip according to the present invention.
Figure 8B:
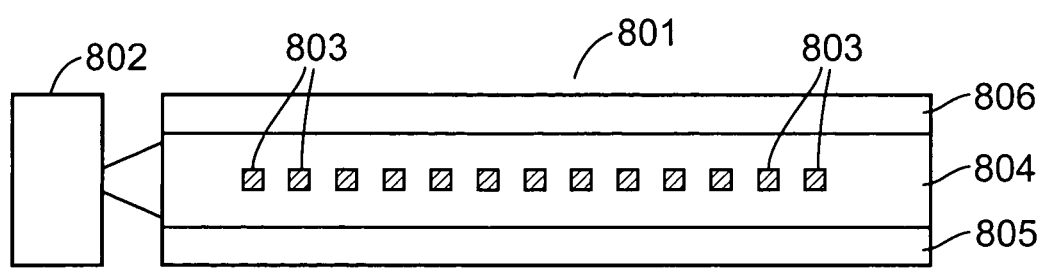

An embodiment of a folded active region embedded within the large high refractive index slab is shown in FIGS. 8A and 8B. One skilled in the art will recognize that any appropriate configuration or routing of active area waveguide within the slab can be utilized. For example, zig-zag configurations may also be utilized in addition to the spiral configuration shown in FIG. 8A. Additionally, linear arrays of active regions may be utilized.

FIG. 8A shows the slow axis view (i.e., the horizontal view) and FIG. 8B shows the fast-axis view (i.e., the vertical cross section) of an active waveguide amplifier or laser chip 801 pumped by a multimode laser diode array in accordance with the present invention. As shown in FIG. 8A, a single mode high refractive index contrast core 803 is arranged on chip 801. Although a spiral arrangement is shown in FIG. 8A, any arrangement that provides a long signal path between a single mode input fiber 807 and a single mode output fiber 808 can be implemented. Light output from laser diode array 802 is captured by an intermediate refractive index contrast cladding layer 804 in which the single-mode high refractive index contrast active waveguide 803 is embedded. FIG. 8B shows a cross section of an area of chip 801 with multiple crossings of single-mode high refractive index contrast active waveguide 803. As an example, active waveguide 803 can be formed from Yb-doped $Al_2O_3$, $Y_2O_3$ or $TiO_2$. Intermediate refractive index contrast cladding 804 can be formed from $Al_2O_3$ or $Y_2O_3$. In this arrangement, a high pump-power density can be achieved in multi-mode cladding 804, which results in highly efficient pumping of active waveguide 803. Cladding 804 may be surrounded by layers 805 and 806.

Multi-port amplifiers can be obtained by routing multiple folded regions of active waveguide such as waveguide 803 within the high Δn slab 804 of chip 801. For example, multiple active cores may be routed together as shown in FIG. 8A. A single multimode pump, therefore, can be shared among several single-mode active amplifying waveguides without the need to split the pump light and separately distribute the light to activate the single-mode amplifying waveguides separately. There is, therefore, no need for pump splitters or multiplexers. Further, the higher area of the active region increases absorption of the pump light, reducing the need for mirrors to rout the pump light through the active regions multiple times.

Figure 9:
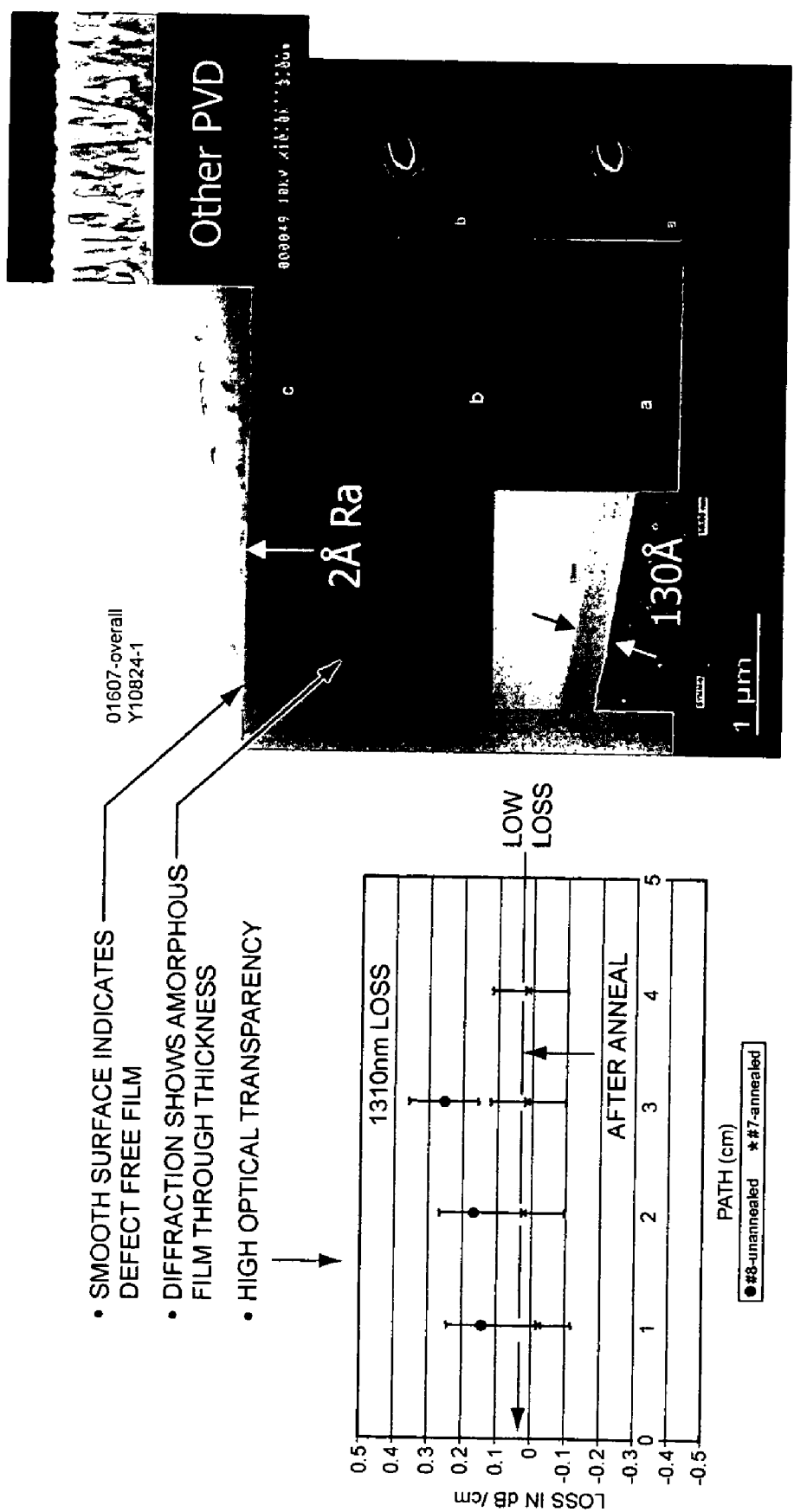
FIG. 9 illustrates the optical materials utilized in waveguides according to the present invention.

FIG. 9 illustrates material depositions that provide high grade, optically transparent, highly uniform slab waveguides with highly controllable Δn values. The production of such waveguides is further discussed in U.S. application Ser. No. 09/903,081, "As-Deposited Optical Waveguides with Low Scattering Loss and Methods for Their Manufacture," by Demaray et al, filed on Jul. 10, 2001; U.S. application Ser. No. 10/101,863, "Biased Pulse DC Sputtering of Oxide Films, by Zhang et al., filed on Mar. 16, 2002; U.S. application Ser. No. 10/101,341, "Rare-Earth Pre-Alloyed PVD Targets for Dielectric Planar Applications," by Milonopoulou et al., filed on Mar. 16, 2002; and application Ser. No. 09/633,307, "Planar Optical Devices and Methods for their Manufacture," by Demaray et al., filed on Aug. 7, 2000, each of which is incorporated by reference herein in its entirety.

Waveguide materials used to form active core waveguides, passive waveguides, and claddings consistent with embodiments of the present invention can be deposited by biased pulsed DC plasma vapor deposition (PVD), as described in U.S. application Ser. No. 10/101,341 (the '341 application). The physical characteristics of the optical material deposited by biased pulsed DC PVD depends on various process parameters, as discussed in the '341 application. A device, including photodetectors and other electronics, such as those shown in FIGS. 3A through 8B and discussed above, can be fabricated by depositing one or more active or passive optical layers and patterning the optical layers to form the waveguides and lens ducts as shown. In some applications, several deposition and patterning steps may be applied to form the desired structures.

As shown in FIG. 9, which shows active and passive waveguide materials of highly amorphous, defect free films of aluminasilicated deposited by biased pulsed DC PVD. Further, the films have very high optical transparency, for example below 0.3 db/cm loss and, in some deposited films, less than about 0.1 db/cm loss. Therefore, deposition of films utilizing biased pulsed-DC PVD are useful for providing structures for optical coupling devices, optical amplifiers, and optical laser structures for highly efficient coupling of pump sources as has been discussed above.

In biased pulsed DC PVD, deposition is performed in a vacuum deposition chamber. A substrate is mounted on a support which also provides an RF bias voltage to the substrate. RF power is supplied to a target formed from material to be deposited as gas is allowed into the chamber. A plasma is excited in the gas and the material is deposited on the substrate. Further, a pulsed DC signal is provided to the target. Further details regarding the deposition process are provided in the '341 application.

Coupling of light, for example from optical fiber 807 into waveguide 803, through efficient mode size conversion is illustrated in FIGS. 10A, 10B, and 10C. Vertically tapered mode-size conversion is further discussed in U.S. application Ser. No. 10/101,492, "Mode Size Converter for a Planar Waveguide," by Tao et al, filed on Mar. 16, 2002, herein incorporated by reference in its entirety. A very smooth vertical taper can efficiently couple light from optical fiber 807 into high refractive index contrast, core waveguide 803 very efficiently. FIG. 10B shows the mode size of an optical beam at a point where light enters waveguide 803. FIG. 10B shows a significantly smaller mode size in the region of waveguide 803 after the adiabatic S-taper mode size converter 1001. Mode size converter 1001 can be produced in a biased pulsed-DC PVD process with a shadow mask.

Table II shows modeling of mode diameter at the output facet of a mode converter for various core/cladding refractive index contrasts Δn. The dimensions in Table II refer to the dimensions of the output facet of the rectangular mode converter.

TABLE II

| Δn | 1.0 μm × 1.0 μm | 1.5 μm × 1.5 μm | 2.0 μm × 2.0 μm | 2.5 μm × 2.5 μm |
| --- | --- | --- | --- | --- |
| 0.43% | 38 μm | 35 μm | 14 μm | 6 μm |
| 0.3% |  | 36 μm | 20 μm | 16 μm |
| 0.2% |  |  | 32 μm | 24 μm |

FIG. 11 illustrates an image concentrator 1101 for adiabatically compressing the diameter of the mode output by a passively Q-switched microchip laser array. Image concentrator 1101 employs a reverse taper 1106, such as that first disclosed in U.S. application Ser. No. 10/101,492 to Tao et al. Reverse taper 1106 can be formed vertically and/or horizontally and thereby provides coupling into a smaller mode size. A further embodiment includes a pitch size conversion such as that illustrated in FIG. 5C. Embodiments of the invention enable the mode size and pitch size conversion of individually addressable microchip laser array, so as to be tailored to standard print pixel densities for use in direct printing and micromaching applications.

Image concentrator 1101 can include an addressable array pump bar 1102 which is capable of addressing and exciting individual pixels of a microchip bar 1103. Array pump bar 1102 includes an array of laser diodes which produce light when individually addressed. Microchip bar 1103, which provides amplification as was discussed in FIGS. 6-8. Beam concentrator chip 1104 can include light ducts or vertical tapers in order to collect a substantial amount of light from microchip bar 1103. Further, a vertical reverse taper 1106, as is described in U.S. application Ser. No. 10/101,492, allows for a compressed output mode. As shown in FIG. 11, the mode of the beam output by beam concentrator chip 1104 is much smaller than the mode of the beam in microchip bar 1103. In some embodiments, a monolithic array beam concentrator chip can convert 50 μm or 90 μm diameter single mode spots from microchip bar 1103 into 20 to 25 μm diameter spots on window 1105.

FIGS. 12A and 12B show mode sizes for some weakly-confined mode propagation in waveguides. FIG. 12A illustrates a 6.2 μm mode diameter at the output facet of a 1.5 μm×3.5 μm waveguide for 980 nm light with a refractive index contrast Δn between the core and the cladding of about 1%. FIG. 12B illustrates a 7.6 μm mode diameter at the output facet of a 1.25 μm×3.5 μm waveguide for 980 nm light with a refractive index contrast of about 1%. As is shown in FIGS. 12A and 12B, the optical energy is concentrated in the center of the facet.

Table III illustrates facet damage considerations in a image concentrator such as image concentrator 1101 shown in FIG. 11. Table III illustrates, for representative pixel densities, the mode size required, the distance between modes, and the resulting power density in image concentrator 1101. The value of 14.2 for power density shown for 2400 dpi pixel density exceeds the damage threshold of Quartz.

TABLE III

| Pixel Density (dpi) | Mode Pitch/Mode Size | Power Density at Facet (GW cm$^{-2}$) | Collimation Distance (μm) |
|---|---|---|---|
| 600 | 42 | 0.9 | 842 |
| 1200 | 21 | 3.6 | 210 |
| 2400 | 11 | 14.2 | 53 |

FIG. 13 illustrates a vertical cavity surface emitting laser (VCSEL)-pumped microchip 1401 according to the present invention. VCSELs 1403 can be deposited on a GaAs substrate 1402. VCSELs 1403 include a dichroic output facet coating. An active gain medium 1404 can be deposited directly over VCSELs 1403. Active gain medium 1404 can be, for example, Nd, Yb, Er, Tm, Ho, Pr, or Ce doped silica. A saturable absorber 1405 can be deposited over gain medium 1404. Saturable absorber 1405 can be, for example, a Cr4+ or Co2+ doped silica film. A VCSEL pumped microchip 1401 can be fabricated using high volume wafer-scale semiconductor manufacturing techniques. The doped silica used for saturable absorber 1405 and active gain medium 1404, for example, can be deposited by biased pulsed-DC PVD processing techniques.

The embodiments discussed here are examples only and are not intended to be limiting of the invention. One skilled in the art will recognize multiple variations that are intended to be within the spirit and scope of the present disclosure.

I claim:

1. An optical waveguide device, comprising:
   at least one laser diode;
   a buffer layer formed on a substrate; and
   at least one amorphous film-based slab waveguide comprising a rare-earth doped material comprising $Al_2O_3$, $Y_2O_3$, or $TiO_2$, having a refractive index contrast of at least 0.2% and optical transparency of below 0.3 dB/cm loss formed on the buffer layer, coupled to receive light from the at least one laser diode, and including an integrated photodiode formed on the substrate,
   wherein the at least one amorphous film-based slab waveguide includes a lens duct formed integrally with the slab waveguide.

2. The optical waveguide device of claim 1, wherein the slab waveguide has an optical transparency exhibiting a light loss of below 0.3 dB/cm.

3. The optical waveguide device of claim 1, wherein the slab waveguide has a smooth surface.

4. The optical waveguide device of claim 1, wherein the at least one laser diode comprises a diode array.

5. The optical waveguide device of claim 1, wherein the slab waveguide includes an active waveguide and a passive cladding, wherein the refractive index of the active waveguide is greater than the refractive index of the passive cladding.

6. The optical waveguide device of claim 5, wherein the slab waveguide is folded in the plane of the slab.

7. The optical waveguide device of claim 5, wherein the passive cladding has a vertical thickness sufficient to capture a substantial amount of light emitted from the at least one laser diode.

8. The optical waveguide device of claim 1, wherein the slab waveguide includes a mode-size converter.

9. The optical waveguide device of claim 1, wherein the at least one laser diode is a vertical cavity surface emitting laser and the slab waveguide is deposited over the vertical cavity surface emitting laser.

10. The optical waveguide device of claim 1, wherein the slab waveguide includes an array of waveguides.

11. The optical waveguide device of claim 9, wherein a mode size of an optical beam transmitted by the slab waveguide is less than a mode size of an incident optical beam.

12. The optical waveguide device of claim 10, wherein the slab waveguide includes at least one vertical reverse taper.

13. An optical waveguide device, comprising:
   at least one laser diode formed on a substrate; and
   at least one amorphous film-based, biased pulsed DC plasma vapor-deposited slab waveguide comprising a rare-earth doped material comprising $Al_2O_3$, $Y_2O_3$, or $TiO_2$ and having a refractive index contrast of at least 0.2% and optical transparency of below 0.3 dB/cm loss formed on the substrate, coupled to receive light from the at least one laser diode, the at least one amorphous film-based slab waveguide including a lens duct formed integrally with the slab waveguide.

14. The optical waveguide device of claim 13, wherein the slab waveguide comprises a core surrounded by a cladding.

15. The optical waveguide device of claim 14, wherein the refractive index of the core is greater than the refractive index of the cladding.

16. The optical waveguide device of claim 14, wherein the core is formed from rare-earth doped $Al_2O_3$, $Y_2O_3$, or $TiO_2$, and the cladding is formed from $Al_2O_3$, or $Y_2O_3$.

17. The optical waveguide of claim 14, wherein the core comprises a single-mode core, and the cladding comprises a multi-mode cladding.

* * * * *